(12) United States Patent
Otsuka

(10) Patent No.: US 9,925,705 B2
(45) Date of Patent: Mar. 27, 2018

(54) MOLDING DIE STRUCTURE OF MOLDED ARTICLE AND MANUFACTURING METHOD OF MOLDED ARTICLE

(71) Applicant: Olympus Corporation, Tokyo (JP)

(72) Inventor: Yoshitaka Otsuka, Hino (JP)

(73) Assignee: Olympus Corporation, Tokyo (JP)

( * ) Notice: Subject to any disclaimer, the term of this patent is extended or adjusted under 35 U.S.C. 154(b) by 729 days.

(21) Appl. No.: 14/458,522

(22) Filed: Aug. 13, 2014

(65) Prior Publication Data

US 2014/0346691 A1   Nov. 27, 2014

Related U.S. Application Data

(63) Continuation of application No. PCT/JP2013/068658, filed on Jul. 8, 2013.

(30) Foreign Application Priority Data

Jul. 9, 2012   (JP) .................. 2012-153916

(51) Int. Cl.
*B29C 45/36* (2006.01)
*B29C 45/40* (2006.01)
(Continued)

(52) U.S. Cl.
CPC ............ *B29C 45/36* (2013.01); *B29C 45/401* (2013.01); *B29C 45/561* (2013.01); *B29C 45/40* (2013.01);
(Continued)

(58) Field of Classification Search
CPC ..... B29C 45/36; B29C 45/401; B29C 45/561; B29C 2045/4063; B29C 45/64; B29C 45/40; B29L 2011/0016
(Continued)

(56) References Cited

U.S. PATENT DOCUMENTS 3,971,841 A * 7/1976 Rubinstein ............ B29C 43/021
   249/59
4,254,933 A * 3/1981 Netto .................. B29C 45/2681
   249/103
(Continued)

FOREIGN PATENT DOCUMENTS

JP    11-042685 A    2/1999
JP    2002-200638 A    7/2002
(Continued)

OTHER PUBLICATIONS

Notification of Transmittal of Translation of the International Preliminary Report on Patentability issued for PCT/JP2013/068658, dated Jan. 22, 2015.
(Continued)

*Primary Examiner* — Nahida Sultana
(74) *Attorney, Agent, or Firm* — Arent Fox LLP

(57) ABSTRACT

Fixed side molding dies are removed from fixed side molding dies insertion hole portions in accordance with the disconnection in the connection/disconnection while maintaining a contact state that a second transfer portion is in contact with a portion other than a fixed side optical functional surface of each molded article at the time of mold opening of a fixed die and a movable die. Thereby a first transfer portion is released from the fixed side optical functional surface.

4 Claims, 19 Drawing Sheets

(51) Int. Cl.
*B29C 45/56* (2006.01)
*B29L 11/00* (2006.01)
*B29C 45/64* (2006.01)

(52) U.S. Cl.
CPC ...... *B29C 45/64* (2013.01); *B29C 2045/4063* (2013.01); *B29L 2011/0016* (2013.01)

(58) Field of Classification Search
USPC .................. 264/1.1, 2.2; 425/556, 577, 542
See application file for complete search history.

(56) References Cited

U.S. PATENT DOCUMENTS

| | | | | |
|---|---|---|---|---|
| 5,137,441 A | * | 8/1992 | Fogarty | B24B 13/005 249/160 |
| 5,284,429 A | * | 2/1994 | Schneider | B29C 45/1736 264/572 |
| 5,329,406 A | * | 7/1994 | Nakanishi | B29C 45/26 264/1.1 |
| 5,458,821 A | * | 10/1995 | Shimazu | B29C 45/263 264/154 |
| 5,855,824 A | * | 1/1999 | Saito | B29C 45/40 264/2.2 |
| 5,948,327 A | * | 9/1999 | Saito | B29C 45/561 264/2.2 |
| 5,972,252 A | * | 10/1999 | Saito | B29C 45/561 264/2.2 |
| 5,976,425 A | * | 11/1999 | Nomura | C03B 11/08 264/1.1 |
| 6,156,242 A | * | 12/2000 | Saito | B29C 33/048 264/2.2 |
| 6,210,610 B1 | * | 4/2001 | Saito | B29C 45/2701 264/2.2 |
| 6,270,698 B1 | * | 8/2001 | Pope | B29C 45/561 264/2.2 |
| 7,326,375 B2 | * | 2/2008 | Nishimoto | B29C 45/561 264/2.2 |
| 2009/0074904 A1 | * | 3/2009 | Goto | B29C 33/56 425/542 |
| 2010/0104855 A1 | * | 4/2010 | Yoshioka | B29B 11/12 428/323 |
| 2012/0217664 A1 | * | 8/2012 | Saitou | B29C 45/561 264/2.2 |
| 2013/0161844 A1 | * | 6/2013 | Takatori | B29D 11/00019 264/1.1 |
| 2016/0129649 A1 | * | 5/2016 | Otsuka | B29D 11/00432 264/1.1 |

FOREIGN PATENT DOCUMENTS

| | | |
|---|---|---|
| JP | 3485562 B2 | 1/2004 |
| JP | 2007-301861 A | 11/2007 |
| JP | 2008-183754 A | 8/2008 |
| WO | WO-2009/084377 A1 | 7/2009 |

OTHER PUBLICATIONS

International Search Report issued for PCT/JP2013/068658, dated Oct. 15, 2013.

* cited by examiner

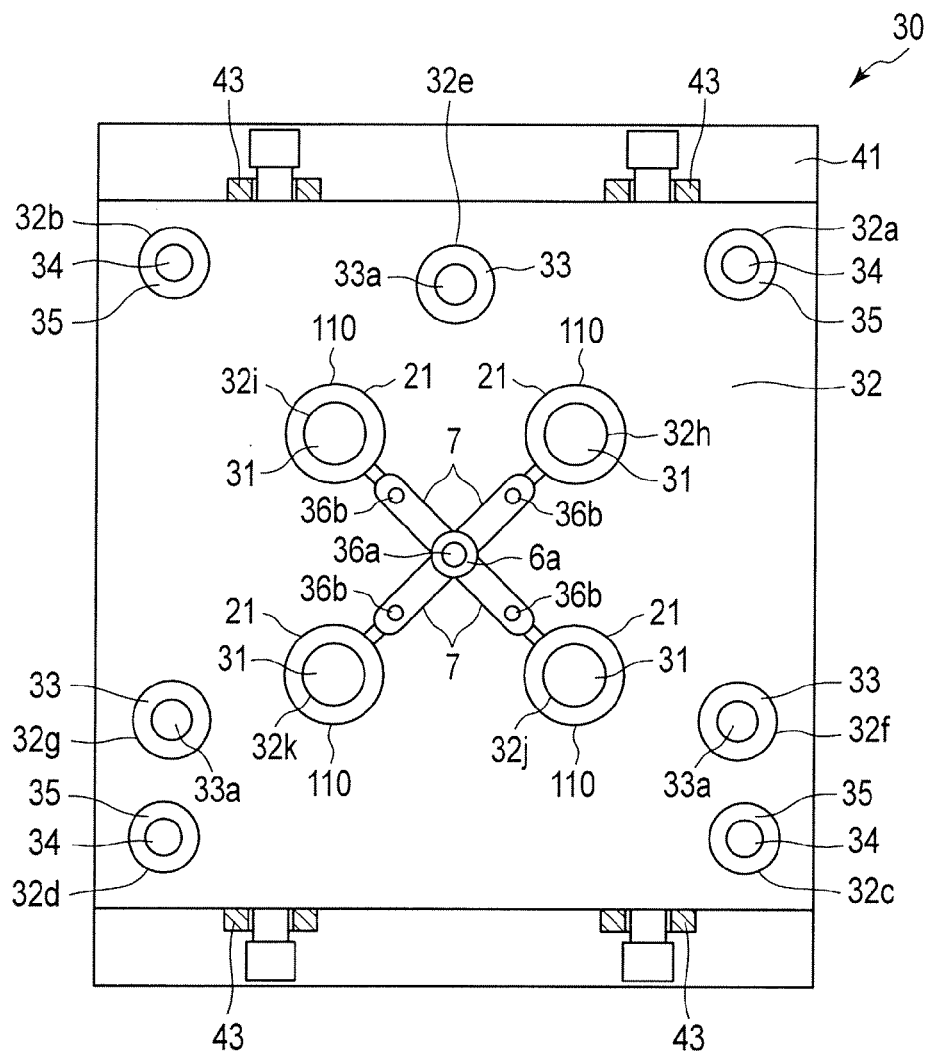
F I G. 2B

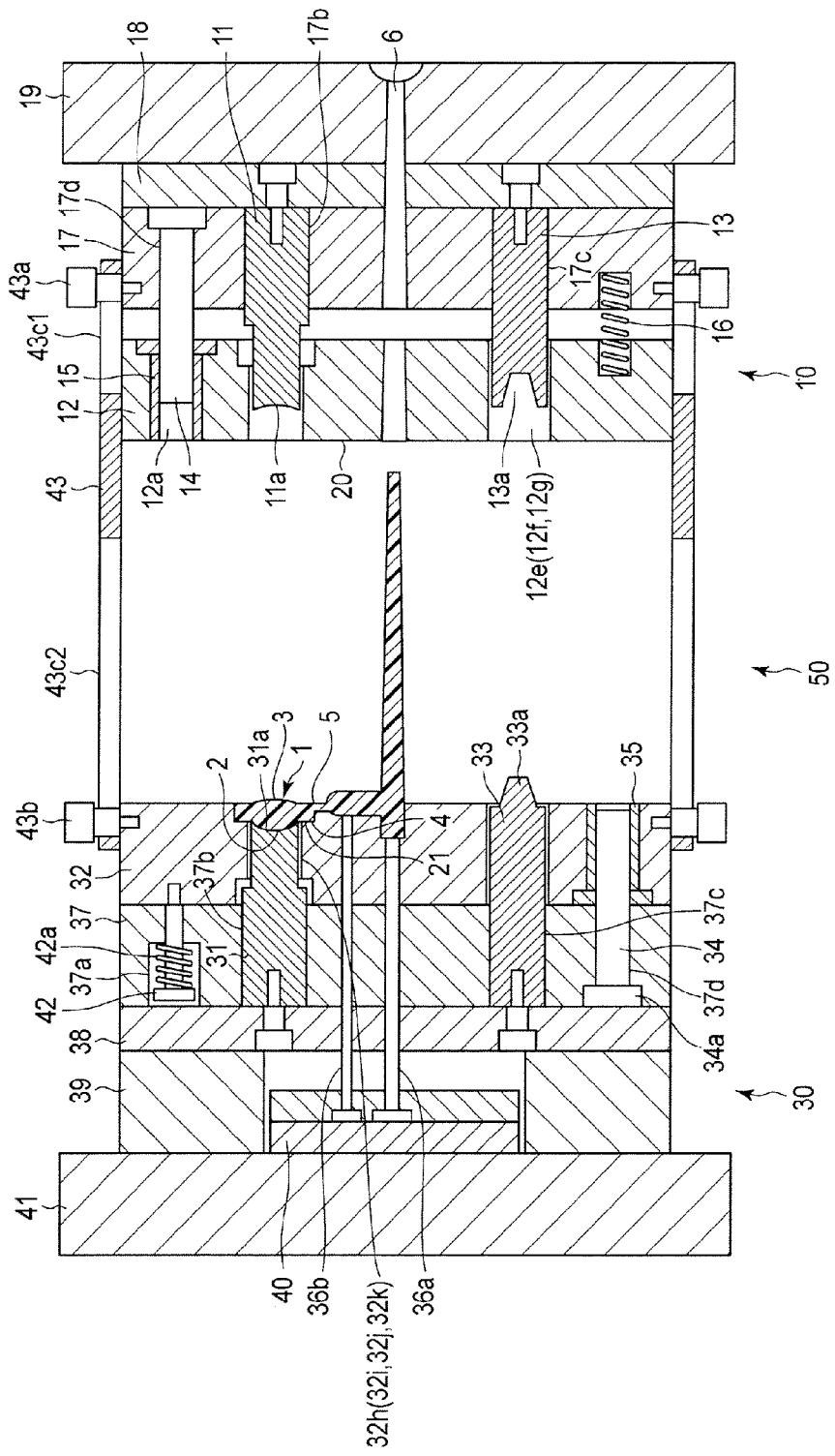
F I G. 5

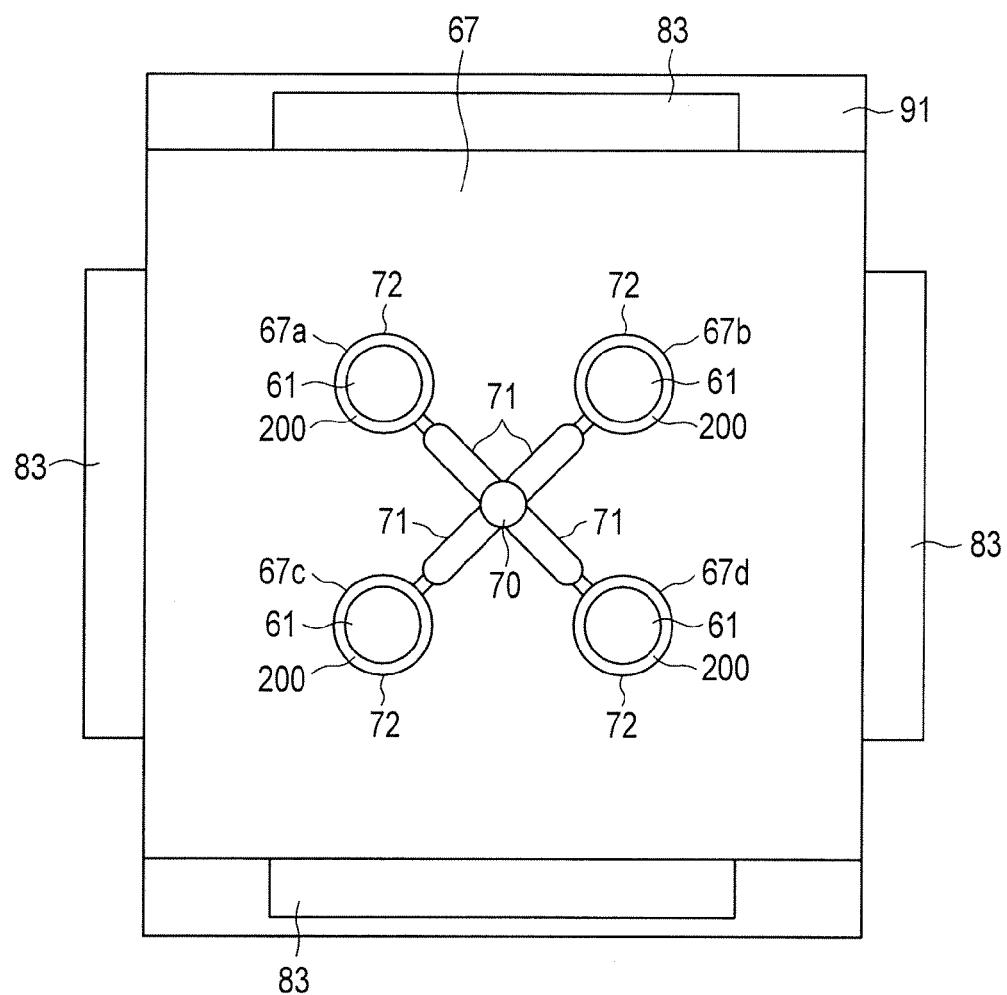
F I G. 9A

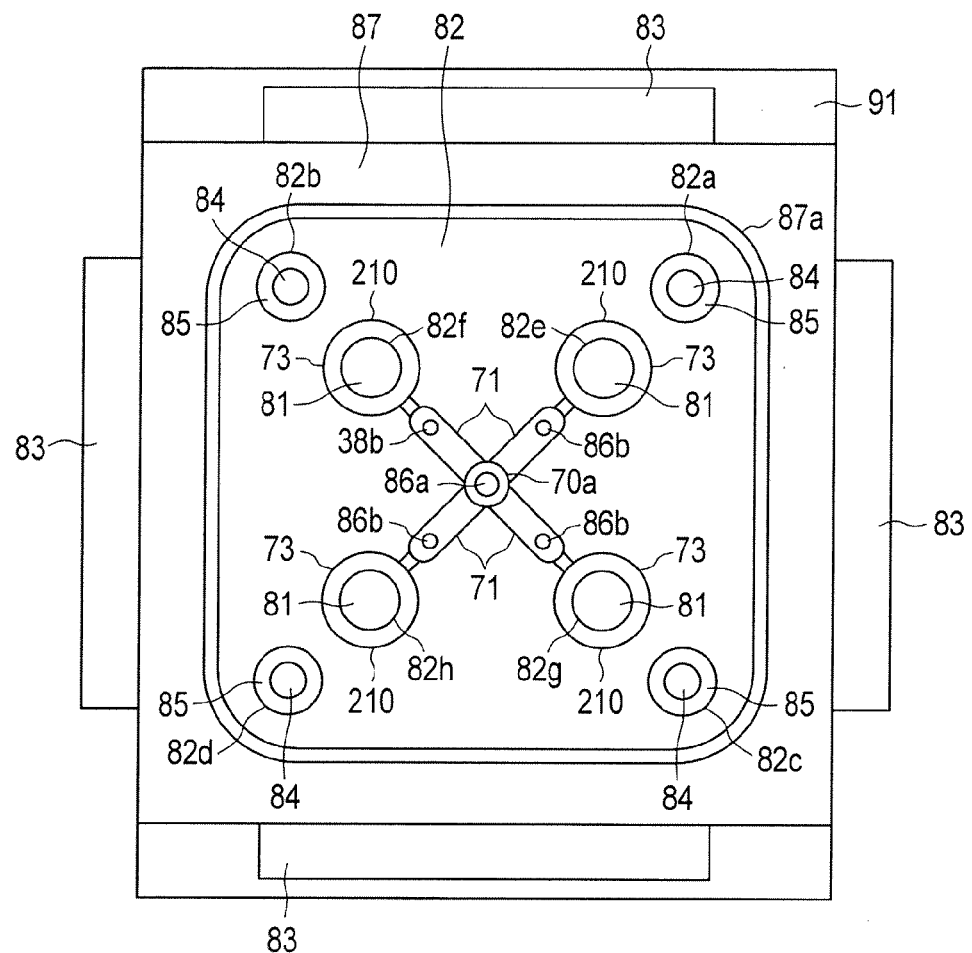
F I G. 9B
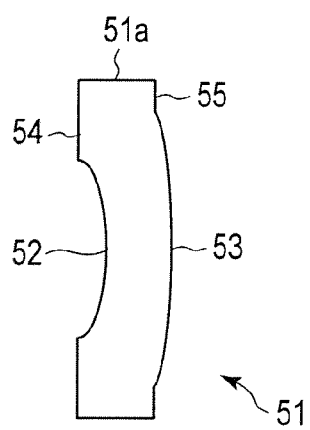
F I G. 10

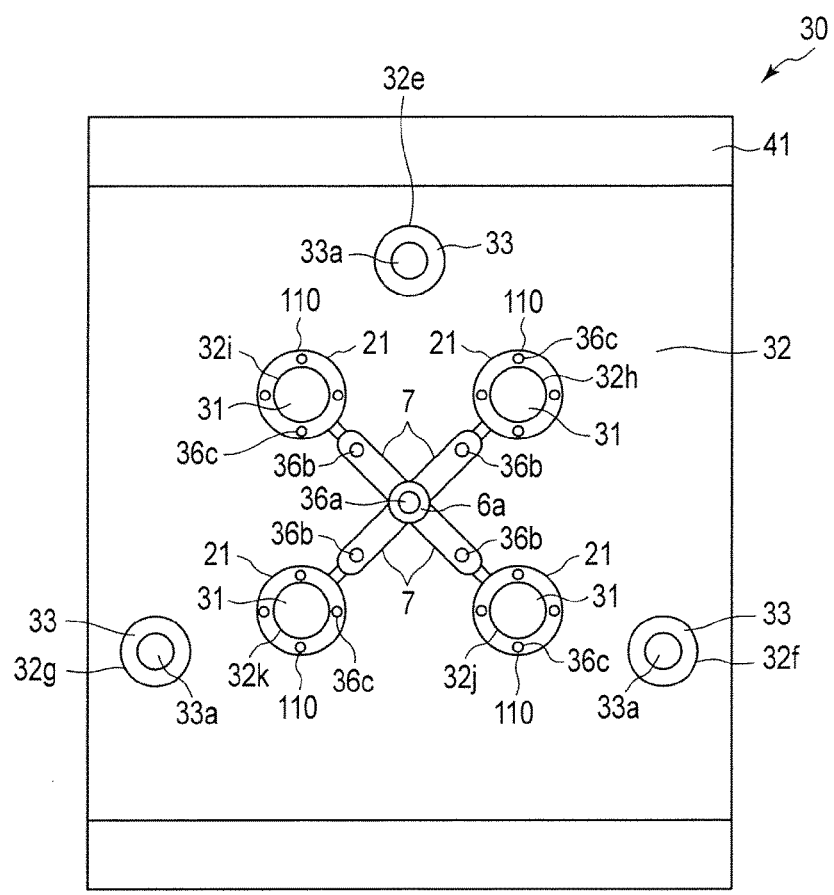
F I G. 15

MOLDING DIE STRUCTURE OF MOLDED ARTICLE AND MANUFACTURING METHOD OF MOLDED ARTICLE

CROSS-REFERENCE TO RELATED APPLICATIONS

This application is a Continuation Application of PCT Application No. PCT/JP2013/068658, filed Jul. 8, 2013 and based upon and claiming the benefit of priority from prior Japanese Patent Application No. 2012-153916, filed Jul. 9, 2012, the entire contents of all of which are incorporated herein by reference.

BACKGROUND OF THE INVENTION

1. Field of the Invention

The present invention relates to a molding die structure of a molded article and a manufacturing method of a molded article for injecting a molding material in cavities formed between two dies separated by a parting line and molding a molded article.

2. Description of the Related Art

In general, for example, a small lens or the like used in a digital camera, an endoscope, a microscope, a mobile phone, and others is manufactured by cavity forming using a resin. As a molding die structure in the cavity forming, a cavity is formed between two dies separated by a parting line. This cavity is filled with a heated and softened thermoplastic material or an energy curing material. As a result, a lens having a highly precise shape is provided. In this case, for example, the lens has two optical surfaces. In lenses of recent years, a smaller displacement of a center position between two optical surfaces (which will be referred to as an eccentricity accuracy hereinafter) is demanded in particular. In lenses molded by injection molding, a technology that improves the eccentricity accuracy of lenses is disclosed in, e.g., Jpn. Pat. Appln. KOKAI Publication No. 2008-183754. In a molding die structure disclosed in Jpn. Pat. Appln. KOKAI Publication No. 2008-183754, two dies separated by a parting line accommodate two molding dies that are used for molding and transferring two optical surfaces of a lens therein. Here, since the two dies are combined in advance and the two dies are subjected to machining at the same time, hole portions that serve as accommodating portions that accommodate the two molding dies are formed. Then, when the molding dies are press-fitted into the hole portions, an axial displacement of the molding dies is improved. As a result, the eccentricity accuracy of the lens is improved.

Further, for example, in Japanese Patent No. 3485562, a ball retainer is provided between a molding die and a die. As a result, a clearance between the molding die and the die in a radial direction is reduced, and the two dies are taper-fitted, thereby improving an axial displacement of the molding die.

BRIEF SUMMARY OF THE INVENTION

An aspect of a molding die structure of a molded article of the present invention is a molding die structure of a molded article that has a molding cavity defined when a fixed die and a movable die are combined with each other and defines a shape of the molded article when a molding material of the molded article is injected into the molding cavity, the molding die structure includes molding dies which are arranged in the fixed die and the movable die and each of which has a first transfer portion that transfers an optical functional surface of the molded article to the molding material; sleeves arranged in the fixed die and the movable die; accommodating portions that are simultaneously and coaxially formed in the sleeve of the fixed die and the sleeve of the movable die, respectively and accommodate the molding dies in a state that the fixed die and the movable die are combined with each other; and a fixed side molded article release member that is arranged in the fixed die and configured to be connected to or disconnected from the sleeve of the fixed die, wherein the fixed side molded article release member includes: an insertion/removal hole portion into/from which the molded dies of the fixed die including the first transfer portion is inserted/removed in accordance with the connection/disconnection; and a second transfer portion that is arranged around the insertion/removal hole portion and transfers a portion other than the optical function surface arranged at a peripheral edge region of the optical functional surface in the molded article to the molding material, and the first transfer portion is released from the optical functional surface when the molding dies are removed from the insertion/removal hole portions in accordance with the disconnection in the connection/disconnection while maintaining a contact state that the second transfer portion is in contact with the portion other than the optical functional surface of each molded article at the time of mold opening of the fixed die and the movable die.

An aspect of a manufacturing method of a molded article of the present invention includes a step of accommodating molding dies in accommodating portions coaxially formed in a sleeve of a fixed die and a sleeve of a movable die at the same time in a state that the fixed die is combined with the movable die, respectively; a step of, at the time of mold clamping of the fixed die and the movable die, defining an optical functional surface of a molded article between a first transfer portion of the molding die arranged in the fixed die and a first transfer portion of the molding die arranged in the movable die, defining a portion other than the optical functional surface arranged at a peripheral edge region of the optical functional surface between a second transfer portion of a molded article release member arranged in the fixed die and a second transfer portion of a molded article release member arranged in the movable die, and molding the molded article in a cavity formed by the definitions; and a fixed side mold release step of releasing the first transfer portion of the fixed die from the optical functional surface when the molding die is removed from the insertion/removal hole portion of the molded article release member in accordance with disconnection of the connection/disconnection while maintaining a contact state that the second transfer portion of the fixed die is in contact with the portion other than the optical function surface of the molded article in the molded article release member arranged in the fixed die that is configured to be connected to or disconnected from the sleeve of the fixed die at the time of mold opening of the fixed die and the movable die.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2B is a front view of a movable die in the molding die according to the first embodiment;

FIG. 5 is a longitudinal cross-sectional view showing a stroke limit state of tension links of the molding die according to the first embodiment;

FIG. 9A is a front view of a fixed die in the molding die according to the second embodiment;

FIG. 9B is a front view of a movable die in the molding die according to the second embodiment;

FIG. 10 is a longitudinal cross-sectional view of a lens molded by the molding die according to the second embodiment;

FIG. 15 is a front view of a movable die in a molding die according to the third embodiment;

DETAILED DESCRIPTION OF THE INVENTION

[First Embodiment]
(Configuration)

Figure 1:
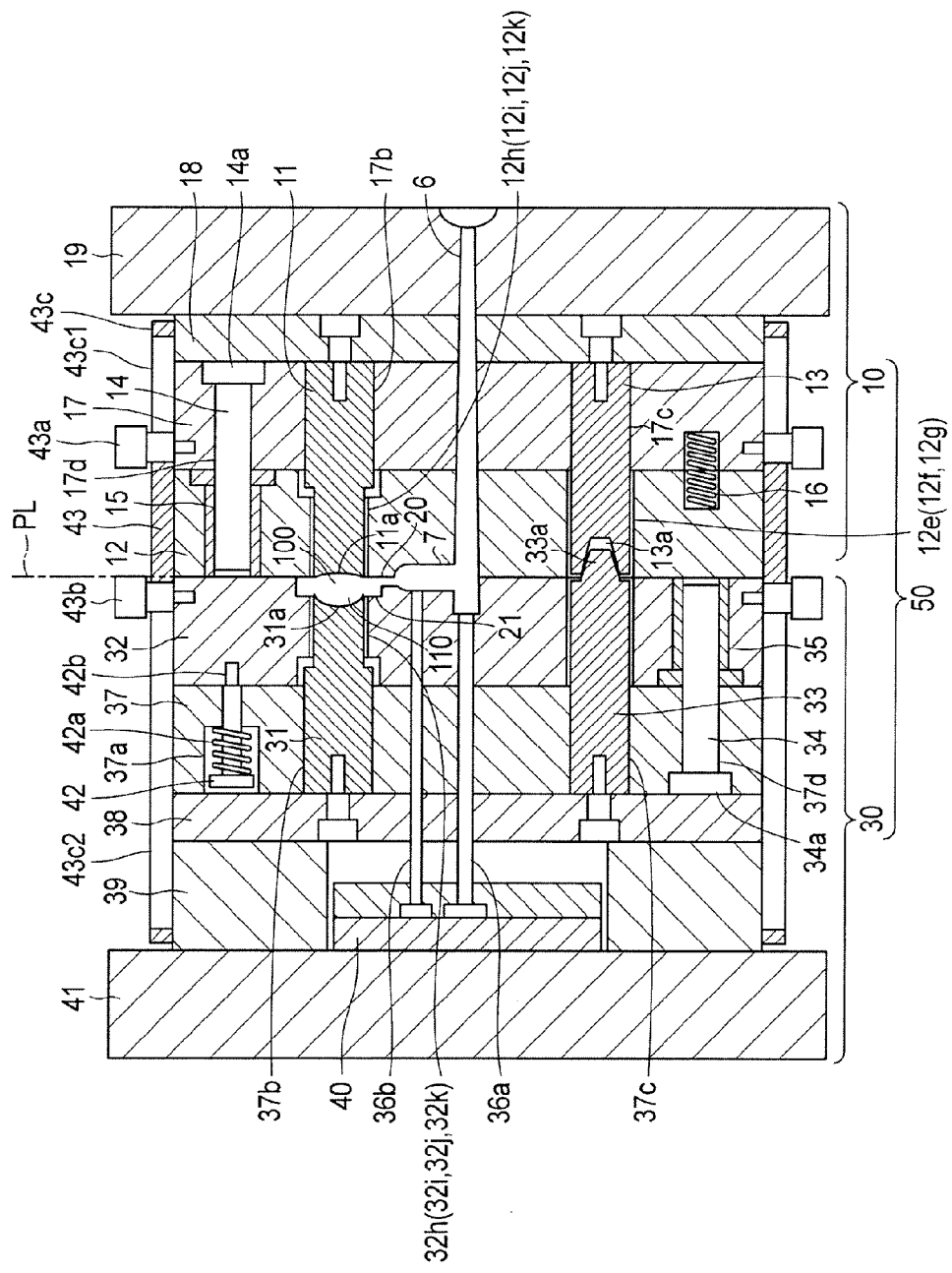
FIG. 1 is a longitudinal cross-sectional view showing a mold clamping state of a molding die structure according to a first embodiment of the present invention.

FIG. 1, FIG. 2A, FIG. 2B, FIG. 3, FIG. 4, FIG. 5, FIG. 6, and FIG. 7 show a first embodiment according to the present invention. FIG. 1 is a longitudinal cross-sectional view showing a mold clamping state of a molding die 50 according to this embodiment. The molding die 50 according to this embodiment has a fixed die 10 and a movable die 30. The fixed die 10 and the movable die 30 are disposed to a platen of a non-illustrated injection molding. Here, the fixed die 10 and the movable die 30 are arranged to face each other to sandwich a PL (parting line). Further, the movable die 30 is supported to be movable in a mold opening/closing direction (a left-and-right direction in FIG. 1) with respect to the fixed die 10.

Figure 2A:
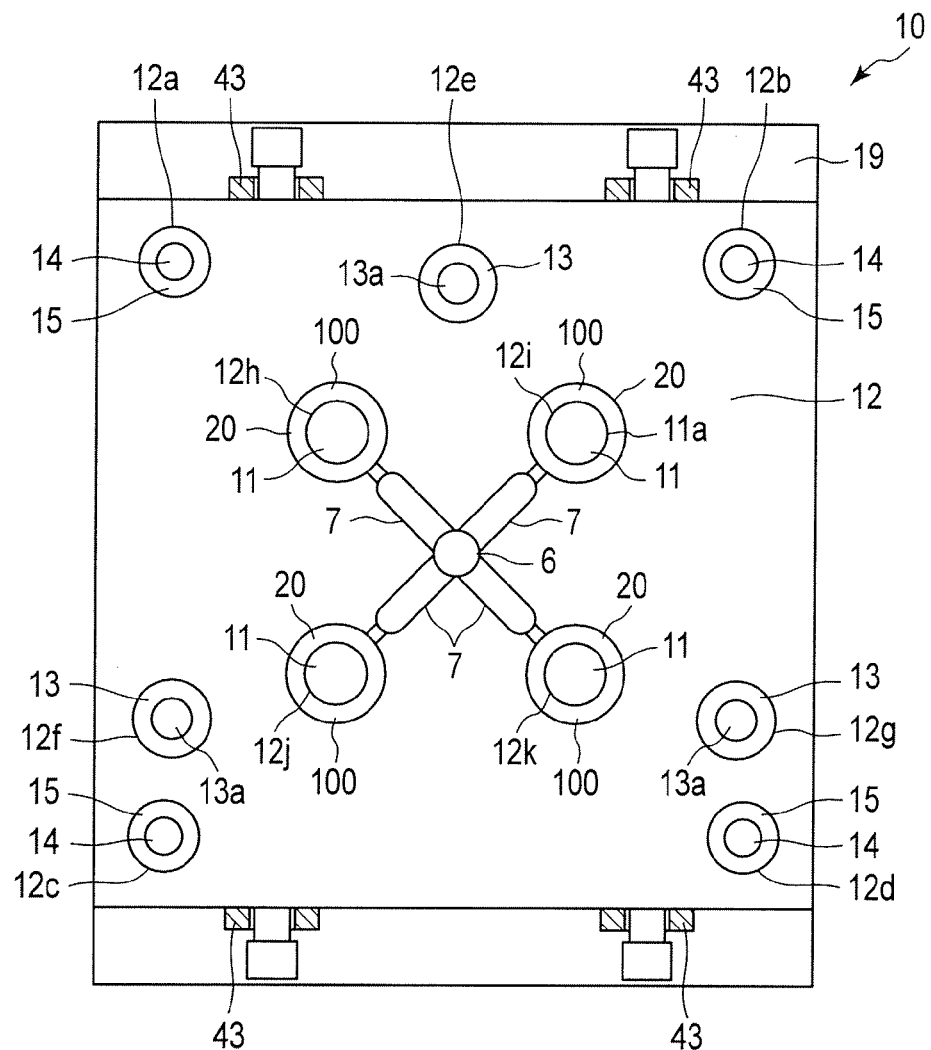
FIG. 2A is a front view of a fixed die in a molding die according to a first embodiment.
Figure 3:
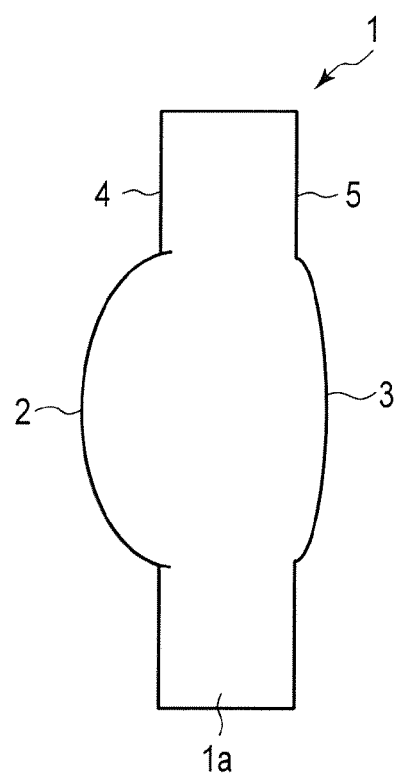
FIG. 3 is a longitudinal cross-sectional view of a lens molded by the molding die according to the first embodiment.

In this embodiment, when the fixed die 10 and the movable die 30 are combined so that the movable die 30 can be clamped with respect to the fixed die 10 as shown in FIG. 1, four molding cavities defining a shape of a molded article 1 that is, e.g., a lens are formed. As shown in FIG. 1, FIG. 2A, and FIG. 2B, each molding cavity has a fixed side cavity 100 and a movable side cavity 110 that face each other. FIG. 3 shows the molded article 1 obtained by the molding die 50 according to this embodiment. The molded article 1 has, e.g., a convex lens made of a resin. The convex lens has an imaging lens for use in, e.g., a camera.

As described above, the molding die 50 has the molding cavities that are defined when the fixed die 10 and the movable die 30 are combined with each other. Further, the molding die 50 defines a shape of the molded article 1 when a molding material of the molded article 1 is injected into each molding cavity.

[Molded Article 1]

As shown in FIG. 3, the molded article 1 has a movable side optical functional surface 2 and a fixed side optical functional surface 3 that function as two optical functional surfaces. The molded article 1 has a flange-shaped outer peripheral edge portion 1a formed at an outer peripheral region of the respective optical functional surfaces 2 and 3. Furthermore, the molded article 1 also has a movable side edge portion 4 and a fixed side edge portion 5 that are formed of the outer peripheral edge portion 1a, arranged at the peripheral edge regions of the optical functional surfaces 2 and 3, and function as portions other than the optical functional surfaces 2 and 3. It is to be noted that the molded article 1 is molded with the use of a light-permeable transparent resin material, e.g., a general transparent resin material such as PC (polycarbonate).

[Fixed Die 10]

As shown in FIG. 1, the fixed die 10 has a fixed side mounting plate 19, a fixed side supporting plate 18, a fixed side sleeve 17, and a fixed side plate 12 as a molded article release member. Here, the fixed side supporting plate 18 and the fixed side sleeve 17 are fixed in a laminated state that they are overlapped on the fixed side mounting plate 19. The fixed side plate 12 can be connected to and disconnected from the fixed side sleeve 17 as will be described later.

FIG. 2A is a front view of the fixed die 10 in the molding die 50. As shown in FIG. 2A, the fixed side mounting plate 19 is a member formed into a substantially rectangular plate shape. Additionally, each of the fixed side supporting plate 18, the fixed side sleeve 17, and the fixed side plate 12 is formed with a length smaller than the fixed side mounting plate 19 at upper and lower end portions thereof in FIG. 2A. Further, later-described tension links 43 are arranged at the upper and lower end portions of each of the fixed side sleeve 17 and the fixed side plate 12.

Further, the fixed plate 10 has a circular-hole-shaped sprue 6 arranged at the center in FIG. 2A. The sprue 6 functions as a channel through which a molten resin as the molding material for the molded article 1 is supplied. The sprue 6 runs through the fixed side mounting plate 19, the fixed side supporting plate 18, the fixed side sleeve 17, and the fixed side plate 12. Furthermore, the fixed side plate 12 has four fixed side cavities 100 on its surface facing the movable die 30. As shown in FIG. 2A, the respective fixed side cavities 100 are arranged at equal intervals from the sprue 6. Here, runners 7 are formed between the four fixed side cavities 100 and the sprue 6.

It is to be noted that, as shown in FIG. 2A, this embodiment includes one sprue 6 and the four fixed side cavities 100, and the four fixed side cavities 100 and the sprue 6 are coupled through the runners 7. Further, this embodiment shows the molding die 50 having a configuration that the four molded articles 1 are injection-molded at a time. However, the number of the molded articles 1 to be acquired is not restricted to four, and it is possible to adopt a molding die that enables injection molding of molded articles whose number is other than four or a molding die that enables injection molding of one molded article alone.

Furthermore, as shown in FIG. 2A, the fixed side plate 12 also has four fixed side guide pin insertion hole portions 12a, 12b, 12c, and 12d and three fixed side positioning pin insertion hole portions 12e, 12f, an 12g. Cylindrical fixed side guide bushes 15 are fitted and inserted into the four fixed side guide pin insertion hole portions 12a, 12b, 12c, and 12d, respectively. A fixed side guide pin 14 is inserted into each of the fixed side guide bushes 15. Fixed side positioning pins 13 are inserted into the three fixed side positioning pin insertion hole portions 12e, 12f, and 12g, respectively.

As shown in FIG. 2A, the fixed side plate 12 has fixed side molding die insertion hole portions 12h, 12i, 12j, and 12k formed at central parts of portions corresponding to the four fixed side cavities 100. Fixed side molding dies 11 are inserted into the four fixed side molding die insertion hole portions 12h, 12i, 12j, and 12k, respectively. As shown in FIG. 1, each fixed side molding die 11 is a member formed into a substantially shaft-like shape. Here, clearances are arranged between the fixed side molding die insertion hole portions 12h, 12i, 12j, and 12k and the fixed side molding dies 11 and between fixed side positioning pin insertion hole portions 12e, 12f, and 12g and fixed side positioning pins 13, and these members are not in contact with each other.

Moreover, as shown in FIG. 1, the fixed side sleeve 17 has a molding die insertion hole portion 17b as an accommodating portion, a positioning pin insertion hole portion 17c, and a guide pin insertion hole portion 17d. Additionally, the fixed side molding die 11 is fitted and inserted into the molding die insertion hole portion 17b, the fixed side positioning pin 13 is fitted and inserted into the positioning pin insertion hole portion 17c, and the fixed side guide pin 14 is fitted and inserted into the guide pin insertion hole portion 17d. Here, respective proximal end portions of the fixed side molding die 11 and the fixed side positioning pin 13 are fixed to the fixed side supporting plate 18 by fixing screws. Further, the fixed side sleeve 17 has a large-diameter hole portion arranged at the proximal end portion of the guide pin insertion hole portion 17d. A proximal end portion of the fixed side guide pin 14 has a retaining large-diameter portion 14a that engages with this large-diameter hole portion. Furthermore, the fixed side guide pin 14 is fixed to the fixed side sleeve 17 in a state that the large-diameter portion 14a is engaged with the large-diameter hole portion.

The fixed side molding dies 11 are arranged in the fixed die 10. Furthermore, as shown in FIG. 1, each fixed side molding die 11 has a concave curved first transfer portion 11a that is formed at a distal end portion of the fixed side molding die 11 and transfers the fixed side optical functional surface 3 of the molded article 1 to the molding material. Moreover, the fixed side plate 12 has second transfer portions 20 each of which is formed at a portion corresponding to each of the four fixed side cavities 100 and transfers a portion (the fixed side edge portion 5) other than the fixed side optical functional surface 3 arranged at the peripheral edge region of the fixed side optical functional surfaces 3. Such fixed side molding die 11 and the fixed side plate 12 function as die components that transfer the first transfer portion 11a and the second transfer portion 20 to the resin material for the molded article 1 on behalf of the fixed side optical functional surface 3 and the fixed side edge portion 5 that are portions requiring a high precision. Moreover, each fixed side cavity 100 according to this embodiment has the first transfer portion 11a of the fixed side molding die 11 and the second transfer portion 20 of the fixed side plate 12. Each fixed side positioning pin 13 has a conical engagement concave portion 13a that is formed at the distal end portion of the fixed side positioning pin 13 and has a diameter that increases toward the distal end side.

Additionally, a coil spring 16 is arranged between the fixed side sleeve 17 and the fixed side plate 12. In a mold closing state shown in FIG. 1, the coil spring 16 is compressed. Further, after start of a mold opening operation of the movable die 30, in an initial stage, the fixed side plate 12 moves in a direction away from the fixed side sleeve 17 by elastic return force of the coil spring 16 until the movable die 30 moves to a first movement position shown in FIG. 4. At this time, when the fixed side plate 12 moves together with the movable die 30, the fixed side plate 12 and the fixed side sleeve 17 move away from each other. That is, the fixed side plate 12 that is a fixed side molded article release member is arranged in the fixed die 10, and it can be connected to and disconnected from the fixed side sleeve 17 of the fixed die 10. Furthermore, the fixed side plate 12 has the fixed side forming die insertion hole portions 12h, 12i, 12j, and 12k as insertion/removal hole portions into/from which the fixed side molding dies 11 each including the first transfer portion 11a are inserted/removed in accordance with the connection/disconnection and the second transfer portions 20 that are arranged around the fixed side molding die insertion hole portions 12h, 12i, 12j, and 12k and transfer the fixed side edge portions 5 that are positions other than the fixed side optical functional surfaces 3 arranged at the peripheral edge regions of the fixed side optical functional surfaces 3 in the molded articles 1 to the molding material.

[Movable Die 30]

As shown in FIG. 1, the movable die 30 has a movable side mounting plate 41, a spacer block 39, a movable side supporting plate 38, a movable side sleeve 37, and a movable side plate 32 that is a molded article release member. Here, the spacer block 39 has an ejector plate 40 that is arranged on the inner side of the spacer block 39 and configures a projection mechanism for taking out the molded article 1. The ejector plate 40 can be connected to or disconnected from the movable side mounting plate 41.

Moreover, the spacer block 39, the movable side supporting plate 38, and the movable side sleeve 37 are fixed in a laminated state that they are overlapped on the movable side mounting plate 41. The movable side plate 32 is configured to be connected to or disconnected from the movable side sleeve 37 as will be described later.

FIG. 2B is a front view of the movable die 30 in the molding die 50. As shown in FIG. 2B, the movable side mounting plate 41 is a member that is formed into a substantially rectangular plate shape. Additionally, each of the spacer block 39, the movable side supporting plate 38, the movable side sleeve 37, and the movable side plate 32 is formed with a length smaller than the movable side mounting plate 41 at upper and lower end portions thereof in FIG. 2B. Further, the later-described tension links 43 are arranged at the upper and lower end portions of each of the spacer block 39, the movable side supporting plate 38, the movable side sleeve 37, and the movable side plate 32.

Furthermore, the movable die 30 has a circular concave portion 6a that is formed in the movable side plate 32, arranged at a central position in FIG. 2B, and corresponds to the sprue 6 of the fixed die 10. Moreover, the movable side plate 32 has four movable side cavities 110 arranged on its surface facing the fixed die 10. The four movable side cavities 110 are arranged at equal intervals from the circular concave portion 6a. Here, runners 7 are formed between the four movable side cavities 110 and the circular concave portion 6a.

Additionally, as shown in FIG. 2B, the movable side plate 32 has four movable side guide pin insertion hole portions 32a, 32b, 32c, and 32d and three movable side positioning pin insertion hole portions 32e, 32f, and 32g. Cylindrical movable side guide bushes 35 are fitted and inserted into the four movable side guide pin insertion hole portions 32a, 32b, 32c, and 32d, respectively. A movable side guide pin 34 is inserted into each of the movable side guide bushes 35. Movable side positioning pins 33 are inserted into the three movable side positioning pin insertion hole portions 32e, 32f, and 32g, respectively.

Further, the movable side plate 32 has movable side molding die insertion hole portions 32h, 32i, 32j, and 32k formed at central parts of portions corresponding to the four movable side cavities 110. Movable side molding dies 31 are inserted into the four movable side molding die insertion hole portions 32h, 32i, 32j, and 32k, respectively. Movable side molding dies 31 are a member formed into a substantially shaft-like shape. Here, clearances are set between the movable side molding die insertion hole portions 32h, 32i, 32j, and 32k and the movable side molding dies 31 and between the movable side positioning pin insertion hole portions 32e, 32f, and 32g and the movable side positioning pins 33, and these members are not in contact with each other.

Furthermore, as shown in FIG. 1, the movable side sleeve 37 has molding die insertion hole portions 37b as accommodating portions, positioning pin insertion hole portions 37c, and guide pin insertion hole portions 37d. Moreover, the movable side molding dies 31 are fitted and inserted into the molding die insertion hole portions 37, the movable side positioning pins 33 are fitted and inserted into the positioning pin insertion hole portions 37c, and the movable side guide pins 34 are fitted and inserted into the guide pin insertion hole portions 37d, respectively. Respective proximal end portions of the movable side molding dies 31 and the movable side positioning pins 33 are fixed to the movable side supporting plate 38 by fixing screws. Additionally, the movable side sleeve 37 has large-diameter hole portions arranged at proximal end portions of the guide pin insertion hole portions 37d, respectively. A proximal end portion of each movable side guide pin 34 has a retaining large-diameter portion 34a that engages with each large-diameter hole portion. Further, each movable side guide pin 34 is fixed to the movable side sleeve 37 in a state that the large-diameter portion 34a of each movable side guide pin 34 is engaged with the large-diameter hole portion of each guide pin insertion hole portion 37d.

Further, in the fixed side sleeve 17 and the movable side sleeve 37, the hole portions holding the respective components (the molding die insertion hole portions 17b and the movable die insertion hole portions 37b, and the positioning pin insertion hole portions 17c and the positioning pin insertion hole portion 37c) are formed when the fixed side sleeve 17 and the movable side sleeve 37 are coaxially bored at the same time in a state that the fixed side sleeve 17 and the movable side sleeve 37 are assembled at the time of fabricating the fixed side sleeve 17 and the movable side sleeve 37. As a result, the hole portions holding the respective components are arranged without a positioning displacement in such a manner that the fixed side molding die 11 and the movable side molding die 31 face each other with less axial displacements at the time of mold clamping. That is, the molding die insertion hole portions 17b as accommodating portions that accommodate the fixed die molding dies 11 and the molding die insertion hole portions 37b as accommodating portions that accommodate the movable side molding dies 31 are coaxially formed in the fixed side sleeve 17 of the fixed die 10 and the movable side sleeve 37 of the movable die 30 at the same time in a state that the fixed die 10 and the movable die 30 are combined with each other.

The movable side molding dies 31 are arranged in the movable die 30. Additionally, as shown in FIG. 1, each movable side molding die 31 has, e.g., a concave curved first transfer portion 31a that is formed at a distal end portion of the movable side molding die 31 and transfers the movable side optical functional surface 2 of the molded article 1 to the molding material. Further, the movable side plate 32 has second transfer portions 21 that are formed at portions corresponding to the four movable side cavities 110 and transfer portions (movable side edge portions 4) other than the movable side optical functional surfaces 2 arranged at the peripheral edge regions of the movable side optical functional surfaces 2. Such movable side molding dies 31 and movable side plate 32 function as die components that transfer the first transfer portions 31a and the second transfer portions 21 to the resin material for the molded articles 1 on behalf of the movable side optical functional surfaces 2 and the movable side edge portions 4 that are portions requiring a high precision. Furthermore, each movable side cavity 110 according to this embodiment has the first transfer portion 31a of the movable side molding die 31 and the second transfer portion 21 of the movable side plate 32. Each movable side positioning pin 33 has a conical engagement convex portion 33a that is formed at the distal end portion of the movable side positioning pin 33 and has a diameter that is reduced toward the distal end side. This engagement convex portion 33a is formed into a shape corresponding to the engagement concave portion 13a of the fixed side positioning pin 13.

Figure 7:
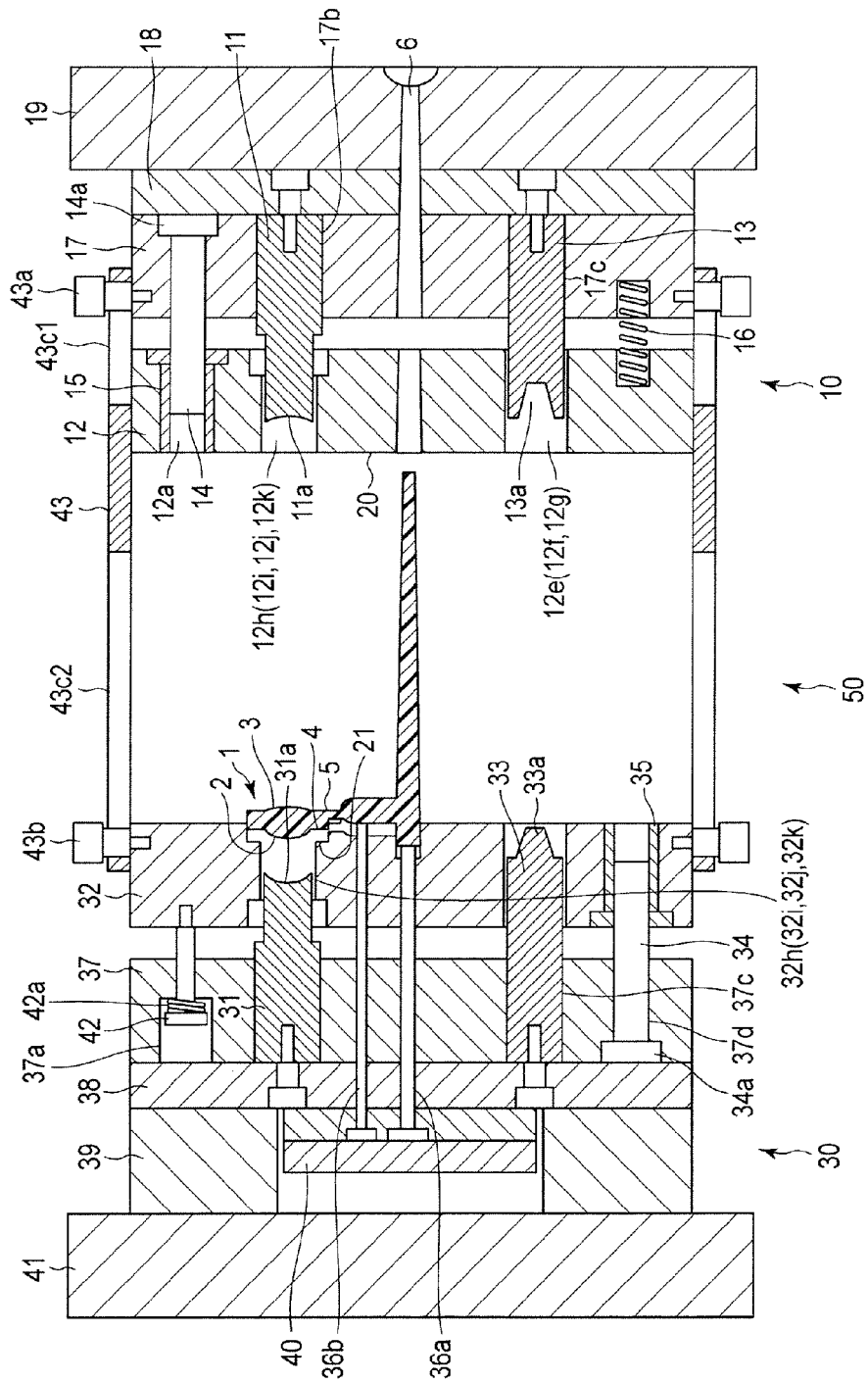
FIG. 7 is a longitudinal cross-sectional view showing a projecting state of a molded article from the molding die according to the first embodiment.

Moreover, the spacer block 39 has the ejector plate 40 that is arranged on the inner side of the spacer block 39 and constitutes a projection mechanism for taking out the molded article 1. This ejector pin 40 has ejector pins (a first ejector pin 36a and four second ejector pins 36b) disposed to the ejector plate 40. Here, the first ejector pin 36a is arranged at a central position of the ejector plate 40 and also arranged at a position corresponding to the circular concave portion 6a. Additionally, the four second ejector pins 36b are arranged around the first ejector pin 36a and also arranged at positions corresponding to the runners 7. Further, the ejector plate 40 moves in a direction (a mold clamping direction) opposite to a mold opening direction of the movable die 30 after the molded article 1 is molded as shown in FIG. 7. With this movement of the ejector pin 40, the first ejector pins 36a protrudes from the circular concave portion 6a, and the four second ejector pins 36b protrude from the runners 7, respectively. As a result, the resin filling the channels that function as the sprue 6 and the runners 7 is projected, and the molded article 1 in the movable die 30 is taken out.

Furthermore, the fixed side sleeve 17 and the movable side plate 32 are coupled with each other through the four tension links 43. This tension link 43 has a first fixing pin 43a fixed to the fixed side sleeve 17, a second fixing pin 43b fixed to the movable side plate 32, and a guide member 43c extended along a mold opening/clamping direction between sidewalls of the fixed die 10 and the movable die 30. The guide member 43c has two guide grooves (a first guide groove 43c1, a second guide groove 43c2). Moreover, the first fixing pin 43a is inserted into the first guide groove 43c1, and the first fixing pin 43a is coupled with the fixed side sleeve 17 to be movable in the mold opening/clamping direction of the movable die 30 along the first guide groove 43c1. Likewise, the second fixing pin 43b is inserted into the second guide groove 43c2, and the second fixing pin 43b is coupled with the movable side plate 32 to be movable in the mold opening/clamping direction of the movable die 30 along the second guide groove 43c2.

Each tension link 43 restricts an operation of the fixed side plate 12 to be connected to or disconnected from the fixed side sleeve 17 by the first guide groove 43c1 and the first fixing pin 43a at the time of the mold opening operation of the movable die 30. Additionally, the second guide groove 43c2 and the second fixing pin 43b restrict an operation of the movable plate 32 to be connected to or disconnected from the movable side sleeve 37.

Further, the movable side sleeve 37 has a coil spring accommodating concave portion 37a that is opened on its surface side that is in contact with the movable side supporting plate 38. This coil spring accommodating concave portion 37a accommodates a coil spring 42a held by a spring support bolt 42. A shaft portion of the spring support bolt 42 penetrates through the movable side sleeve 37 to be extended toward the movable side plate 32. Furthermore, a male screw portion 42b of the spring support bolt 42 is screwed and fixed to the movable side plate 32. That is, the movable side plate 32 that is a movable side molded article release member is arranged in the movable die 30, and it can be connected to and disconnected from the movable side sleeve 37 of the movable die 30. Moreover, the movable side plate 32 has the movable side molding die insertion hole portions 32h, 32i, 32j, 32k that are insertion/removal hole portions into/from which the movable side molding dies 31 including the first transfer portions 31a are inserted/removed in accordance with the connection/disconnection, respectively and second transfer portions 21 that are arranged around the movable side molding die insertion hole portions 32h, 32i, 32j, 32k and transfer to the molding material the movable side edge portions 4 that are portions other than the movable side optical functional surfaces 2 arranged at the peripheral edge regions of the movable side optical functional surfaces 2 in the molded article 1, respectively.

(Function)

Figure 4:
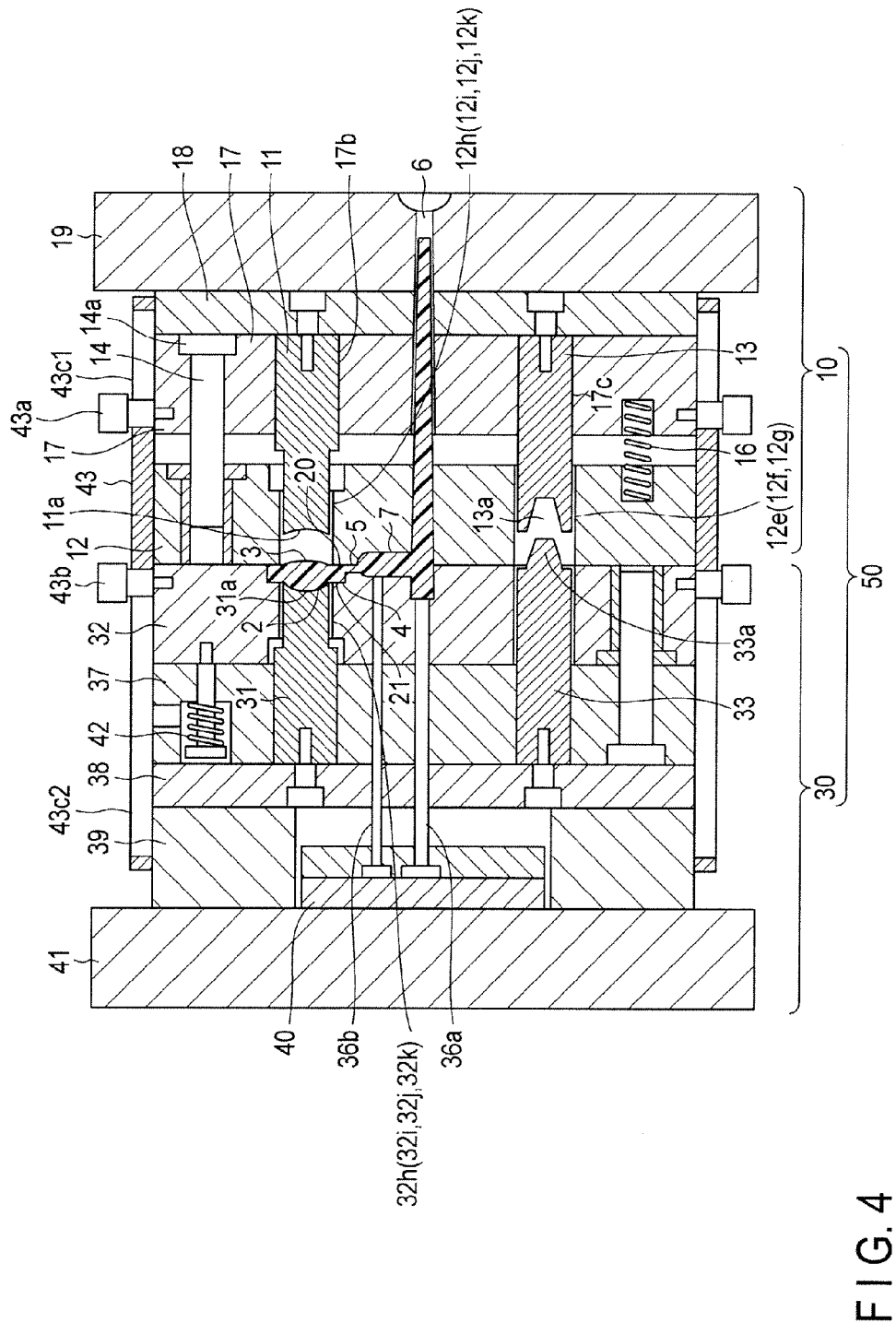
FIG. 4 is a longitudinal cross-sectional view showing a mold releasing state of the fixed die according to the first embodiment.
Figure 6:
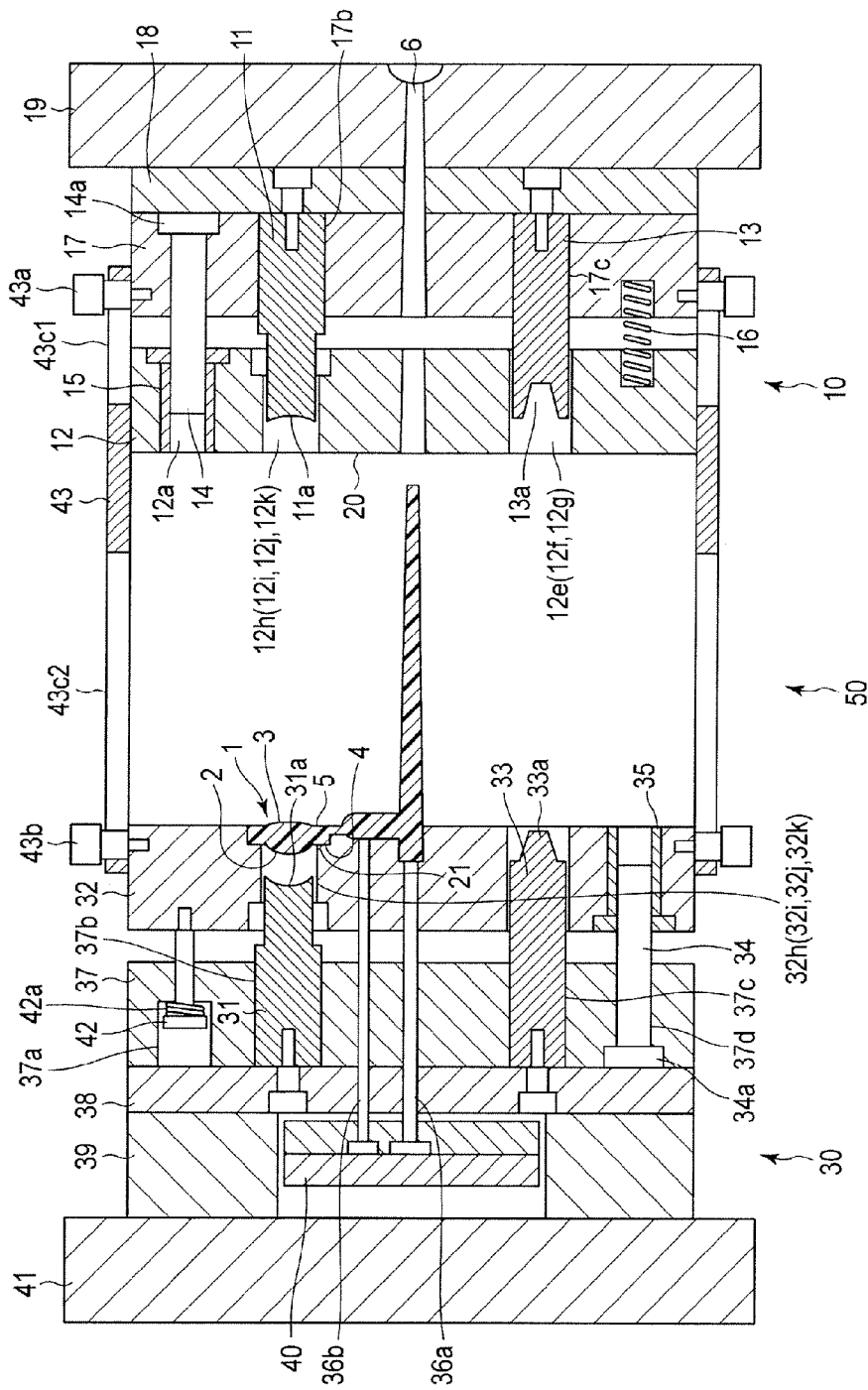
FIG. 6 is a longitudinal cross-sectional view showing a mold opening state after completion of molding of the molding die according to the first embodiment.

A function of the configuration will now be described. Here, a manufacturing method of the molded article 1 molded by the molding die 50 according to this embodiment will be described. FIG. 1 shows a mold clamping state of the molding die 50 according to this embodiment. FIG. 6 shows a mold opening completion state of the movable die after completion of molding of the molding die 50. Further, FIG. 4 and FIG. 5 show on-going stages of a mold opening operation of the movable die 30, and FIG. 7 shows a step of taking out the molded article 1 after completion of mold opening.

At the beginning of manufacture of the molded article 1, the movable die 30 in the mold opening state shown in FIG. 6 moves closer to the fixed die 10. As a result, the movable side plate 32 and the movable side sleeve 37 are first closed by spring force of the coil spring 42a of the spring support bolt 42. Subsequently, the entire movable die 30 integrally moves toward the fixed die 10, and the movable side plate 32 comes into contact with the fixed side plate 12.

Thereafter, the fixed side plate 12 moves toward the fixed side sleeve 17 together with the movable die 30 against spring force of the coil spring 16. As a result, the fixed side plate 12 abuts on the fixed side sleeve 17 (see FIG. 1). At this mold clamping position in FIG. 1, when the engagement convex portions 33a and the engagement concave portions 13a engage with each other, the movable die 30 and the fixed die 10 are subjected to alignment and mold clamping. As a result, the molding cavities (the fixed side cavities 100 and the movable side cavities 110) for the molded articles 1 and the channels (the runners 7) communicating with the molding cavities are formed. In the mold closing state shown in FIG. 1, the coil spring 16 is compressed, and the coil spring 42a is held in a natural state (a non-compressed state).

Then, a non-illustrated resin injection unit supplies a molten material that is the molding material for each molded article 1 to the sprue 6. The molten material is, e.g., a transparent resin. The molten material is supplied into the molding cavities through the runners 7 and fills these cavities. Subsequently, a pressure holding state of the molten material filling the molding cavities is maintained with a desired pressure for a desired time. When the molten material is cooled, each molded article 1 is obtained.

Thereafter, the movable die 30 moves in a direction away from the fixed die 10. That is, mold opening is carried out. At this time, the fixed side plate 12 is separated from the fixed side sleeve 17 by spring force of the compressed coil spring 16 as shown in FIG. 4. Moreover, the fixed side plate 12 moves in a mold opening direction together with the movable die 30. At this time, the fixed side molding dies 11 are removed from the fixed side molding die insertion hole portions 12h, 12i, 12j, and 12k. That is, the first transfer portions 11a are retracted from the same plane as the second transfer portions 20. As described above, in each of the molded articles 1, the fixed side edge portion 5 is supported by the second transfer portion 20 of the fixed side plate 12, and the fixed side optical functional surface 3 comes off the first transfer portion 11a of the fixed side molding die 11 in this state. Additionally, when the movable die 30 moves to the first movement position shown in FIG. 4, the movement of the fixed side plate 12 is completed.

As described above, in a state that the contact state that each second transfer portion 20 is in contact with each fixed side edge portion 5 that is a portion other than the optical functional surface of each molded article 1 is maintained at the time of mold opening, when the fixed side molding die 11 is removed from each of the fixed side molding die insertion hole portions 12h, 12i, 12j, and 12k in accordance with separation of the fixed side plate 12 in connection/disconnection of the fixed side plate 12 to/from the fixed side sleeve 17, the first transfer portion 11a is released from the fixed side optical functional surface 3.

Then, as shown in FIG. 5, the movable die 30 further moves away from the fixed die 10. The fixed side edge portion 5 of each molded article 1 is separated from the second transfer portion 20 by the subsequent mold opening operation of the movable die 30 from the first movement position. Further, during the mold opening operation of the movable die 30, the molded article (a lens made of a resin) 1 is assuredly held in the movable die 30.

Subsequently, when the movable die 30 moves to a second movement position shown in FIG. 5, the tension links 43 reach a maximum stroke. Further, after start of the mold opening operation of the movable die 30, the movable die 30 is maintained in a state that the movable side plate 32 is in contact with the movable side sleeve 37 until the movable die 30 moves to the second movement position shown in FIG. 5. In this state, the coil spring 42a is held in an initial state (an initial compression applying state).

Then, the movable die 30 moves from the second movement position shown in FIG. 5 to a third movement position (a final mold opening position) shown in FIG. 6. At the time of an operation that the movable die 30 moves from the second movement position to the third movement position, the movable side plate 32 is pulled by the tension links 43. Therefore, at the time of the mold opening operation of the movable die 30 after the mold opening state (the second movement position) shown in FIG. 5, the movable side plate 32 is separated and pulled up from the movable side sleeve 37. At this time, as shown in FIG. 6, the movable side molding dies 31 are removed from the movable side molding die insertion hole portions 32h, 32i, 32j, and 32k. That is, the first transfer portions 31a are retracted from the same plane as the second transfer portions 21. Further, each molded article 1 is released from each movable side molding die 31. At this operation, in each of the molded articles 1, the movable side edge portion 4 is supported by the second transfer portion 21 of the movable side plate 32. In this state, the movable side optical functional surface 2 comes off the first transfer portion 31a of the movable side molding die 31. At this time, with the movement of the movable side plate 32, the coil spring 42a is compressed by the support bolt 42. Additionally, when the movable die 30 moves to the third movement position (the final mold opening portion) shown in FIG. 6, the movement (mold opening) of the movable die 30 is completed. At the time of completion of the mold opening, the coil spring 42a is compressed in a maximum compressed state.

As described above, at the time of mold opening, in a state that a contact condition of each second transfer portion 21 with each movable side edge portion 4 that is a portion other than the optical functional surface of the molded article 1 is maintained, when the movable side molding die 31 is removed from each of the movable side molding die insertion hole portions 32h, 32i, 32j, and 32k in accordance with the separation of the movable side plate 32 in the connection/disconnection of the movable side plate 32 to/from the movable side sleeve 37, each first transfer portion 31a is released from the movable side optical function surface 2.

Moreover, after the movable die 30 has moved to the third movement position (the final mold opening position) shown in FIG. 6, as shown in FIG. 7, the ejector plate 40 is driven by an ejection mechanism of a molding machine. At this time, the ejector plate 40 moves in the direction (the mold closing direction) opposite to the mold opening direction of the movable die 30. With the movement of the ejector plate 40, the first ejector pin 36a protrudes from the circular concave portion 6a, and the second ejector pins 36b protrude from the runners 7. The first ejector pin 36a and the second ejector pins 36b included in the ejection mechanism are arranged in the movable die 30. The first ejector pin 36a and the second ejector pins 36b communicate with the molding cavities, abut on the molding material filling the channel portions (the runners 7) through which the molding material flows, move the second transfer portions 21 from the movable side edge portions 4 that are portions other than the optical functional surfaces of the molded articles 1 by pushing out the molding material filling the channel portions, and take the molded articles 1 from the movable die 30. As a result, in each molded article 1 arranged in the movable die 30, the movable side edge portion 4 comes off the second transfer portion 21 of the movable side plate 32, and the molded article 1 is taken out.

Then, the based on the above-described series of steps, molding of each molded article (the lens made of a resin) 1 is repeatedly carried out.

(Effect)

Thus, the above-described configuration exercises the following effect. That is, in the fixed side sleeve 17 and the movable side sleeve 37 of the molding die 50 for the molded article 1 according to this embodiment, the hole portions holding the respective components (the molding die insertion hole portions 17b and the movable die insertion hole portions 37b, and the positioning pin insertion hole portions 17c and the positioning pin insertion hole portion 37c) are formed when the fixed side sleeve 17 and the movable side sleeve 37 are coaxially bored at the same time (machined together) in a state that the fixed side sleeve 17 and the movable side sleeve 37 are assembled at the time of fabricating the fixed side sleeve 17 and the movable side sleeve 37. As a result, the hole portions holding the respective components are arranged without a positioning displacement in such a manner that the fixed side molding dies 11 and the movable side molding dies 31 face each other with less axial displacements at the time of mold clamping. Therefore, each highly precise molded article 1 that has less surface axial displacements on each surface of the molded article 1 is stably molded at a low cost.

In the mold clamping position shown in FIG. 1 that the movable die 30 abuts on the fixed die 10, when the engagement convex portions 33a and the engagement concave portions 13a engage with each other, the movable die 30 and the fixed die 10 are subjected to alignment and mold clamping. As a result, the fixed side molding dies 11 and the movable side molding dies 31 are highly accurately positioned relative to the fixed side sleeve 17 and the movable side sleeve 37 without axial displacement. Therefore, each highly precise molded article 1 that has less surface axial displacements on each surface of the molded article 1 is stably molded at a low cost.

Additionally, as shown in FIG. 4, after the injection molding of each molded article 1, when the molded article 1 is released from each fixed side molding die 11 in the fixed die 10, the fixed side edge portion 5 in the molded article 1 is supported by the second transfer portion 20 of the fixed side plate 12. In this state, the fixed side optical functional surface 3 is removed from the first transfer portion 11a of each fixed side molding die 11. As described above, since the fixed side edge portion 5 is supported by the second transfer portion 20, the fixed side optical functional surface 3 is stably removed from the first transfer portion 11a, and the fixed side optical functional surface 3 is prevented from being attached to the first transfer portion 11a. That is, in the fixed die 10, mold release is performed in incremental steps.

Likewise, at the time of releasing the molded article 1 from the movable die 30, as shown in FIG. 6, in the molded article 1, the movable side edge portion 4 is supported by the second transfer portion 21 of the movable side plate 32. In this state, the movable side optical functional surface 2 is removed from the first transfer portion 31a of the movable side molding die 31. As described above, since the movable side edge portion 4 is supported by the second transfer portion 21, the movable side optical functional surface 2 is stably removed from the first transfer portion 31a, and the movable side optical functional surface 2 is prevented from being attached to the first transfer portion 31a. That is, in the movable die 30, the mold release is gradually carried out.

Further, based on the above configuration, each molded article 1 is prevented from being deformed.

Therefore, according to this embodiment, in the movable side optical functional surface 2 and the fixed side optical functional surface 3 as portions that need a high accuracy with less axial displacements of each molded article 1 and the fixed side molding die 11 and the movable side molding die 31 as die components that transfer the movable side optical functional surface 2 and the fixed side optical functional surface 3 to the resin material for the molded article 1, the fixed side molding die 11 is fixed to the molding die insertion hole portion 17b as the accommodating portion, and the movable side molding die 31 is fixed to the molding die insertion hole portion 37b as the accommodating portion. Therefore, in this embodiment, the function of releasing the molded article 1 can be carried out by using the fixed side plate 12 and the movable side sleeve 37 in incremental steps. Therefore, a projecting region that is required for taking out the molded article 1 from the molding die 50 does not have to be provided to the molded article 1, and a highly accurate lens that is not deformed can be molded even in the molded article 1 having a small diameter.

Furthermore, the fixed side molding die 11 or the movable side molding die 31 do not have to slide for transfer. Therefore, a sliding clearance is not required, axial displacements of the respective optical functional surfaces 2 and 3 can be suppressed to the minimum level, and each highly accurate molded article 1 with less axial displacement can be stably produced.

[Second Embodiment]
(Configuration)

Figure 8:
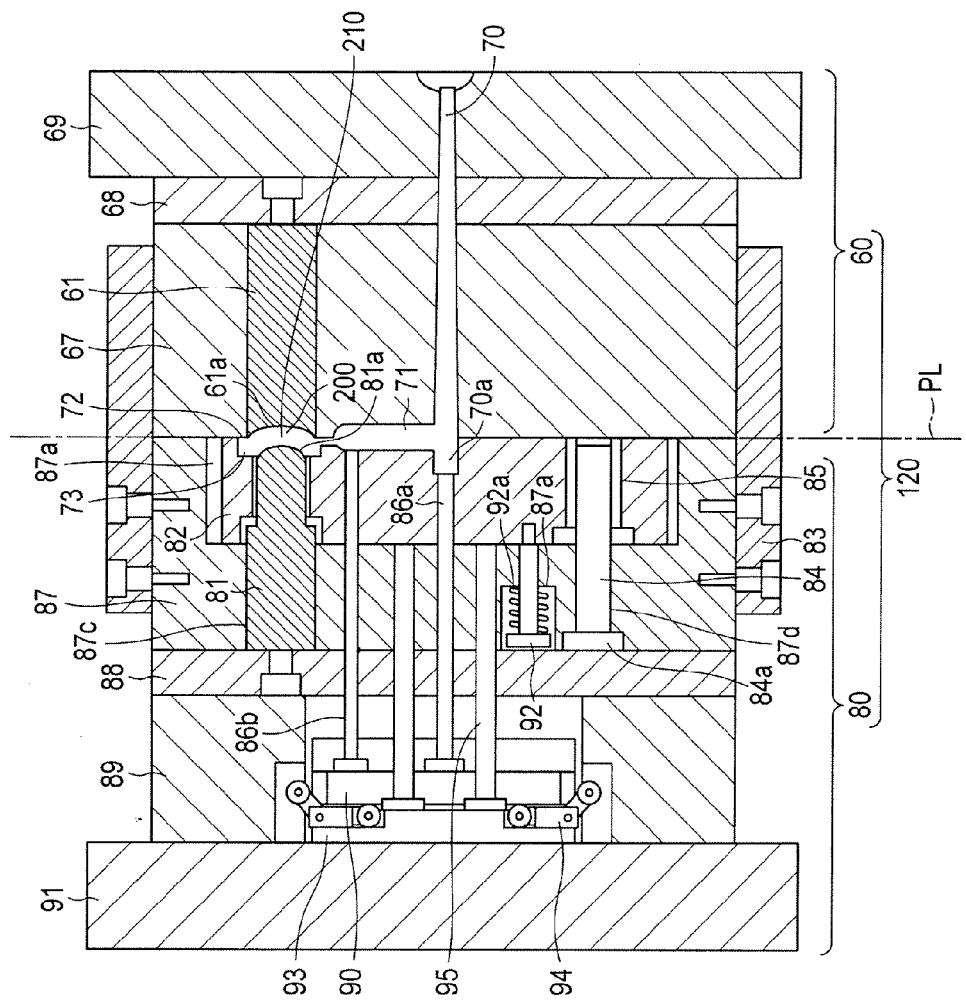
FIG. 8 is a longitudinal cross-sectional view showing a mold clamping state of a molding die according to a second embodiment of the present invention.

FIG. 8, FIG. 9A, FIG. 9B, FIG. 10, FIG. 11, FIG. 12, and FIG. 13 show a second embodiment according to the present invention. FIG. 8 is a longitudinal cross-sectional view showing a mold clamping state of a molding die 120 according to this embodiment. A configuration of the molding die 120 will now be described with reference to FIG. 8. The molding die 120 according to this embodiment has a fixed die 60 and a movable die 80 arranged to face each other to sandwich a PL line therebetween. The fixed die 60 and the movable die 80 are disposed to a platen of a non-illustrated injection molding machine. Furthermore, the movable die 80 is arranged to be movable in a mold opening/closing direction (a left-and-right direction in FIG. 8) with respect to the fixed die 60. FIG. 9A is a front view of the fixed die 60 of the molding die 120 according to this embodiment, and FIG. 9B is a front view of the movable die 80.

In this embodiment, when the fixed die 60 and the movable die 80 are combined so that the movable die 80 can be clamped with respect to the fixed die 60 as shown in FIG. 8, four molding cavities 200 (see FIG. 9A) defining a shape of a molded article 51 are formed. FIG. 10 shows the molded die 51 obtained by the molding die 120 according to this embodiment.

[Molded Article 51]

The molded article 51 according to this embodiment has, e.g., a meniscus lens made of a resin. The meniscus lens has, e.g., a convex shape. The meniscus lens is used in, e.g., a camera. As shown in FIG. 10, the molded article 51 has a movable side optical functional surface 52 and a fixed side optical functional surface 53 that function as two optical functional surfaces. Moreover, the molded article 51 has a flange-shaped outer peripheral edge portion 51a formed at an outer peripheral region of the respective optical functional surfaces 52 and 53. Additionally, the molded article 51 has a movable side edge portion 54 and a fixed side edge portion 55 that are formed on the outer peripheral edge portion 51a, arranged at the peripheral region of the respective optical functional surfaces 52 and 53, and function as portions other than the optical functional surfaces 52 and 53. This molded article 51 is molded with the use of a light-permeable transparent resin material, e.g., a transparent resin material such as COP (a cycloolefin polymer).

[Fixed Die 60]

As shown in FIG. 8, the fixed die 60 has a fixed side mounting plate 69, a fixed side supporting plate 68, and a fixed side sleeve 67. Here, the fixed side supporting plate 68 and the fixed side sleeve 67 are fixed in a laminated state that they are overlapped on the fixed side mounting plate 69.

FIG. 9A is a front view of the fixed die 60 in the molding die 120. As shown in FIG. 9A, the fixed side mounting plate 69 is a member formed into a substantially rectangular plate shape. Additionally, each of the fixed side supporting plate 68 and the fixed side sleeve 67 is formed with a length smaller than the fixed side mounting plate 69 at upper and lower end portions thereof in FIG. 9A. Further, the upper and lower end portions of the fixed side sleeve 67 are detachably engaged with later-described positioning blocks 83, respectively.

Furthermore, the fixed die 60 has a circular-hole-shaped sprue 70 arranged at the center in FIG. 9A. The sprue 70 functions as a channel through which a molten resin as a molding material for the molded article 51 is supplied. The sprue 70 runs through the fixed side mounting plate 69, the fixed side supporting plate 68, and the fixed side sleeve 67. Furthermore, the fixed side sleeve 67 has four fixed side cavities 200 on its surface facing the movable die 80. The respective fixed side cavities 200 are arranged at equal intervals from the sprue 70. Here, runners 71 are formed between the four fixed side cavities 200 and the sprue 71.

Moreover, as shown in FIG. 9A, the fixed side sleeve 67 has fixed side molding die insertion hole portions 62a, 62b, 62c, and 62d formed at portions corresponding to the four fixed side cavities 200. Fixed side molding dies 61 are inserted into the four fixed side molding die insertion hole portions 62a, 62b, 62c, and 62d, respectively. Each fixed side molding die 61 is a member formed into a substantially shaft-like shape. Here, clearances are arranged between the fixed side molding die insertion hole portions 62a, 62b, 62c, and 62d and the fixed side molding dies 61, and these members are not in contact with each other.

A proximal end portion of each fixed side molding die 61 is fixed to the fixed side supporting plate 68 by a fixing screw. Each fixed side molding die 61 has a concave curved first transfer portion 61a that is formed at a distal end portion of the fixed side molding die 61 and transfers the fixed side optical functional surface 53 of the molded article 51. Furthermore, the fixed side sleeve 67 has second transfer portions 72 each of which is formed at a portion corresponding to each of the four fixed side cavities 200 and transfers a portion (a fixed side edge portion 55) other than the fixed side optical functional surface 53 arranged at the peripheral edge region of the fixed side optical functional surface 53. Moreover, each fixed side cavity 200 according to this embodiment has the first transfer portion 61*a* of the fixed side molding die 61 and the second transfer portion 72 of the fixed side sleeve 67.

[Movable Die 80]

The movable die 80 has a movable side mounting plate 91, a spacer block 89, a movable side supporting plate 88, a movable side sleeve 87, and a movable side plate (a molded article release member) 82. The spacer block 89 has an ejector plate 90 constituting a projection mechanism for taking out the molded article 51 and a stripper projection plate 93. The ejector plate 90 and the stripper projection plate 93 are arranged on the inner side of the spacer block 89 and can be connected to or disconnected from the movable side mounting plate 91. The ejector plate 90 has ejector pins 86. Stripper rods 95 and double projection units 94 are disposed to the stripper projection plate 93.

FIG. 9B is a front view of the movable die 80 in the molding die 120. As shown in FIG. 9B, the movable side mounting plate 91 is a member that is formed into a substantially rectangular plate shape. Moreover, each of the spacer block 89, the movable side supporting plate 88, and the movable side sleeve 87 is formed with a length shorter than the movable side mounting plate 91 at upper and lower ends in FIG. 8B. The movable side sleeve 87 has a substantially rectangular concave portion 87*a* that is formed on an opposed surface side relative to the fixed die 60 and accommodates the movable side plate 82. The movable side plate 82 is accommodated in the concave portion 87*a* to be movable in the mold opening/closing direction of the movable die 80.

Additionally, the movable die 80 has a circular concave portion 70*a* that is formed on the movable side plate 82, arranged at a central position in FIG. 9B, and corresponds to the sprue 70 of the fixed die 60. The four movable side cavities 210 are formed on the movable side plate 82 and on the opposed surface relative to the fixed die 60. The four movable side cavities 210 are arranged at equal intervals from the circular concave portion 70*a*. Here, runners 71 are formed between the four movable side cavities 210 and the circular concave portion 70*a*.

Further, as shown in FIG. 9B, the movable side plate 82 has four movable side guide pin insertion hole portions 82*a*, 82*b*, 82*c*, and 82*d*. Cylindrical movable side guide bushes 85 are fitted and inserted into the four movable side guide pin insertion hole portions 82*a*, 82*b*, 82*c*, and 82*d*, respectively. A movable side guide pin 84 is inserted into each movable side guide bush 85.

Moreover, the movable side plate 82 has movable side molding die insertion hole portions 82*e*, 82*f*, 82*g*, and 82*h* formed at central parts of portions corresponding to the four movable side cavities 210, respectively. Movable side molding dies 81 are inserted into the four movable side molding die insertion hole portions 82*e*, 82*f*, 82*g*, and 82*h*, respectively. The movable side molding die 81 is a member formed into a substantially shaft-like shape. Here, clearances are arranged between the movable side molding die insertion hole portions 82*e*, 82*f*, 82*g*, and 82*h* and the movable side molding dies 81, and they are not in contact with each other.

As shown in FIG. 8, the movable side sleeve 87 has movable side molding die insertion hole portions (accommodating portions) 87*c* and guide pin insertion hole portions 87*d*. Additionally, the movable side molding dies 81 are fitted and inserted into the movable side molding die insertion hole portions 87*c*, respectively, and the movable side guide pins 84 are fitted and inserted into the guide pin insertion hole portions 87*d*, respectively. Further, the positioning blocks 83 are disposed to four sides of an outer peripheral surface of the movable side sleeve 87. Proximal end portions of the four positioning blocks 83 are screwed and fixed to the outer peripheral region of the movable side sleeve 87 by fixing screws. A proximal end portion of each movable side molding die 81 is fixed to the movable side supporting plate 88 by a fixing screw. Furthermore, the movable side sleeve 87 has a large-diameter hole portion arranged at a proximal end portion of each guide pin insertion hole portion 87*d*. Each movable side guide pin 84 has a retaining large-diameter portion 84*a* that is formed at the proximal end portion of the movable side guide pin 84 and engages with the large-diameter hole portion of the guide pin insertion hole portion 87*d*. Moreover, the large-diameter portion 84*a* of the movable side guide pin 84 is fixed while being engaged with the large-diameter hole portion of the guide pin insertion hole portion 87*d*.

Additionally, in the fixed side sleeve 67 and the movable side sleeve 87, at the time of fabricating the fixed side sleeve 67 and the movable side sleeve 87, an outer peripheral surface wall of the fixed side sleeve 67 and an outer peripheral wall surface of the movable side sleeve 87 are simultaneously machined in a state that the fixed side sleeve 67 and the movable side sleeve 87 are assembled. Further, when the fixed side sleeve 67 and the movable side sleeve 87 are coaxially bored at the same time, the hole portions (the fixed side molding die insertion hole portions 62*a*, 62*b*, 62*c*, and 62*d* and the movable side molding die insertion hole portions 87*c*) holding the respective molding dies (the fixed side molding die 61 and the movable side molding die 81) of the fixed side sleeve 67 and the movable side sleeve 87 are formed. As a result, the hole portions holding the respective molding dies have no positional displacement, and they are arranged by the positioning blocks 83 in such a manner that they face the fixed side molding die 61 and the movable side molding die 81 with less axial displacements at the time of molding clamping.

Each movable side molding die 81 has a convex curved first transfer portion 81*a* that is formed at a distal end portion of the movable side molding die 81 and transfers the movable side optical functional surface 52 of each molded article 51. Further, the movable side plate 82 has second transfer portions 73 each of which is formed at a portion corresponding to each of the four movable side cavities 210 and transfers a portion (the movable side edge portion 54) other than the movable side optical functional surface 52 arranged at the peripheral edge region of the movable side optical functional surface. Furthermore, each movable side cavity 210 in the movable die 80 according to this embodiment has a first transfer portion 81*a* of the movable side molding die 81 and the second transfer portion 73 of the movable side plate 82.

Moreover, the movable side sleeve 87 has a coil spring accommodating concave portion 87*b* opened on the contact surface side relative to the movable side supporting plate 88. This coil spring accommodating concave portion 87*b* accommodates a coil spring 92*a* held by a spring support bolt 92. A shaft portion of the spring support bolt 92 penetrates through the movable side sleeve 87 to be extended toward the movable side plate 82. Furthermore, a male screw portion of the spring support bolt 92 is screwed and fixed to the movable side plate 82.

Moreover, the spacer block 89 has an ejector plate 90 that is arranged on the inner side of the spacer block 89 and configures a projection mechanism for taking out the molded article 51. This ejector plate 90 has ejector pins (a first ejector pin 86*a* and four second ejector pins 86*b*) disposed thereto. Here, the first ejector pin 86*a* is arranged at a central position of the ejector plate 90 and also arranged at a position corresponding to the circular concave portion 70*a*. Additionally, the four second ejector pins 86*b* are arranged around the first ejector pin 86*a* at positions corresponding to the runners 71.

Figure 12:
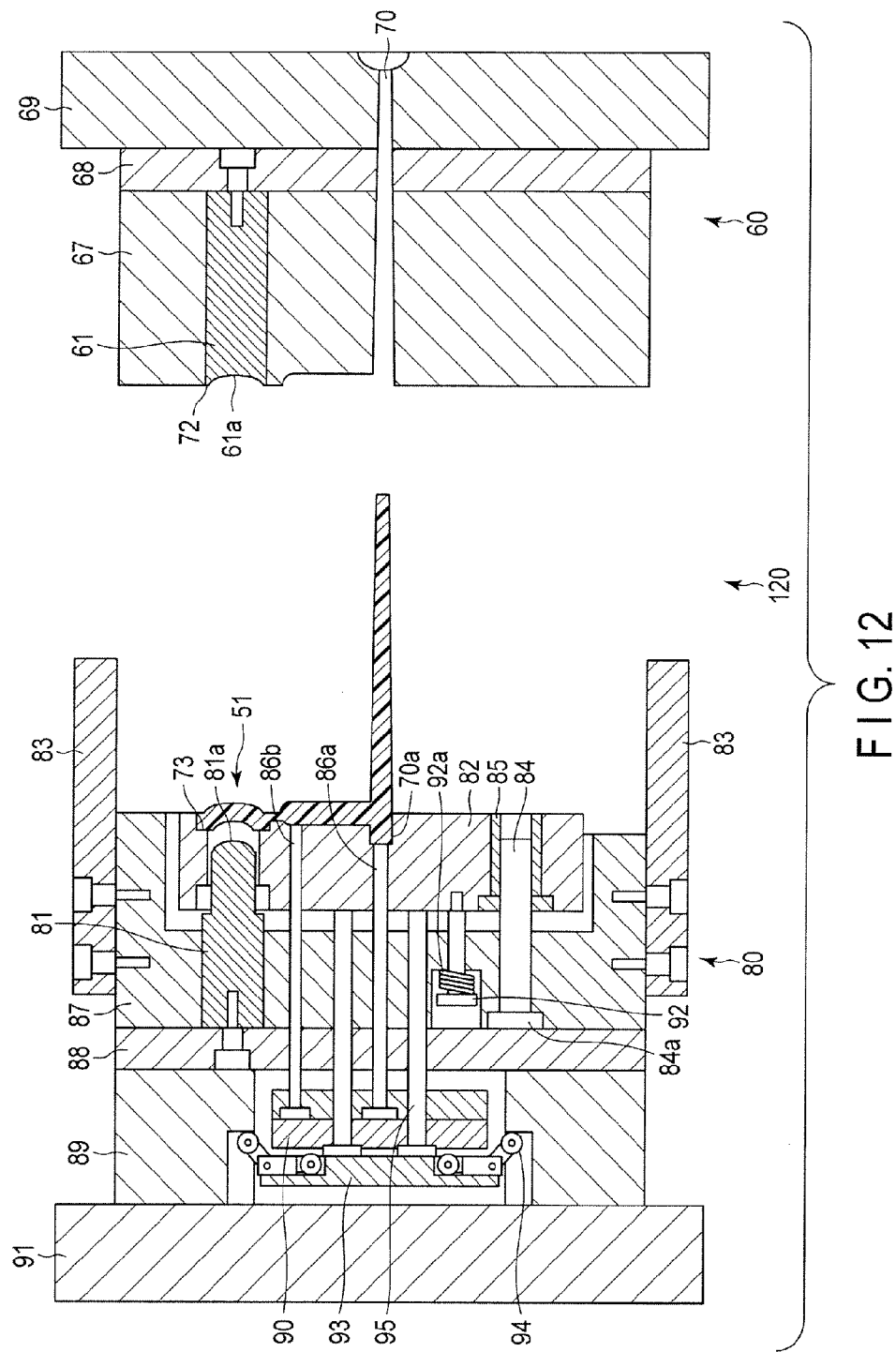
FIG. 12 is a longitudinal cross-sectional view showing a mold release state of the movable die according to the second embodiment.
Figure 13:
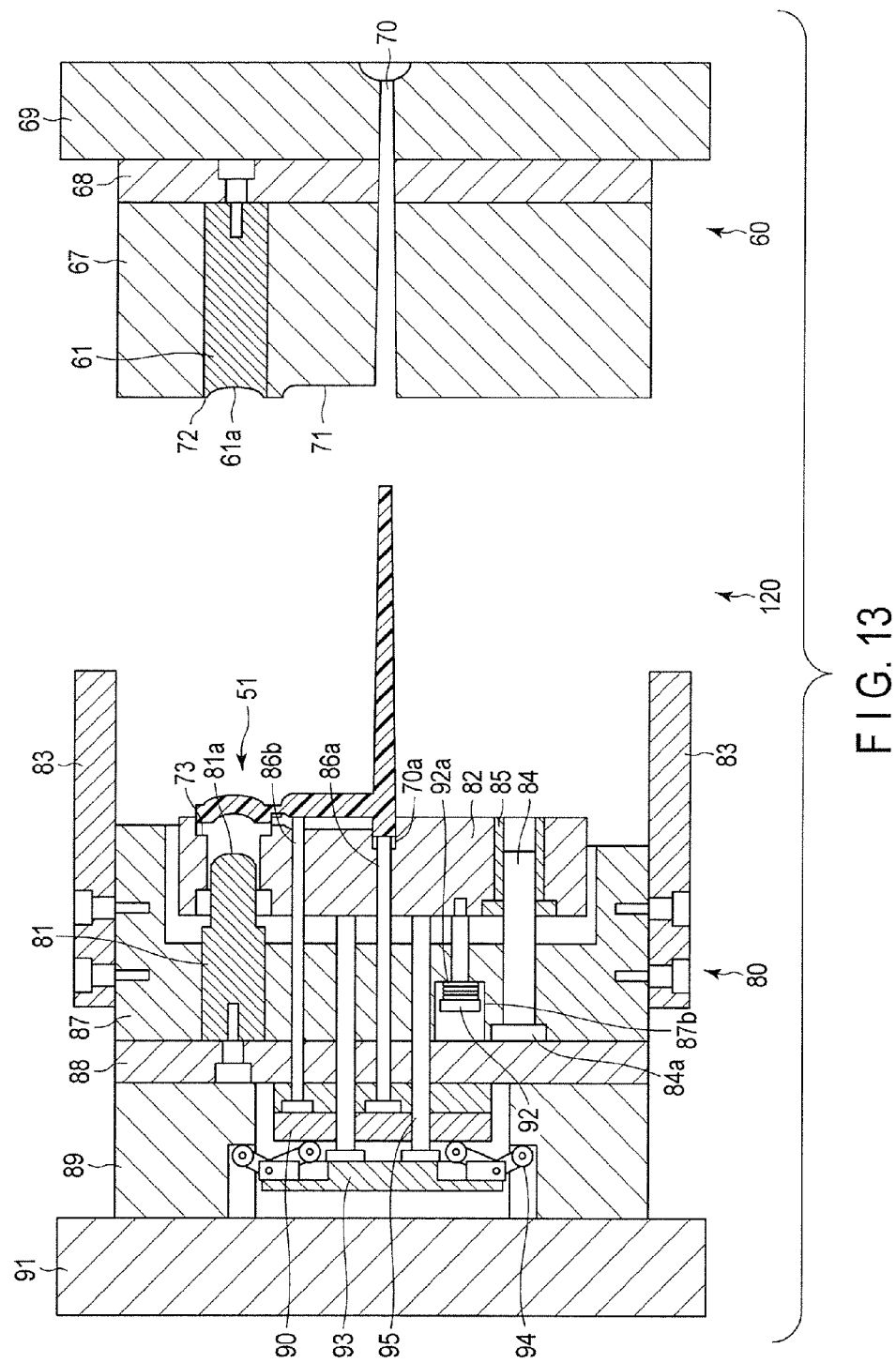
FIG. 13 is a longitudinal cross-sectional view showing a protruding state of a molded article from the molding die according to the second embodiment.
Figure 14:
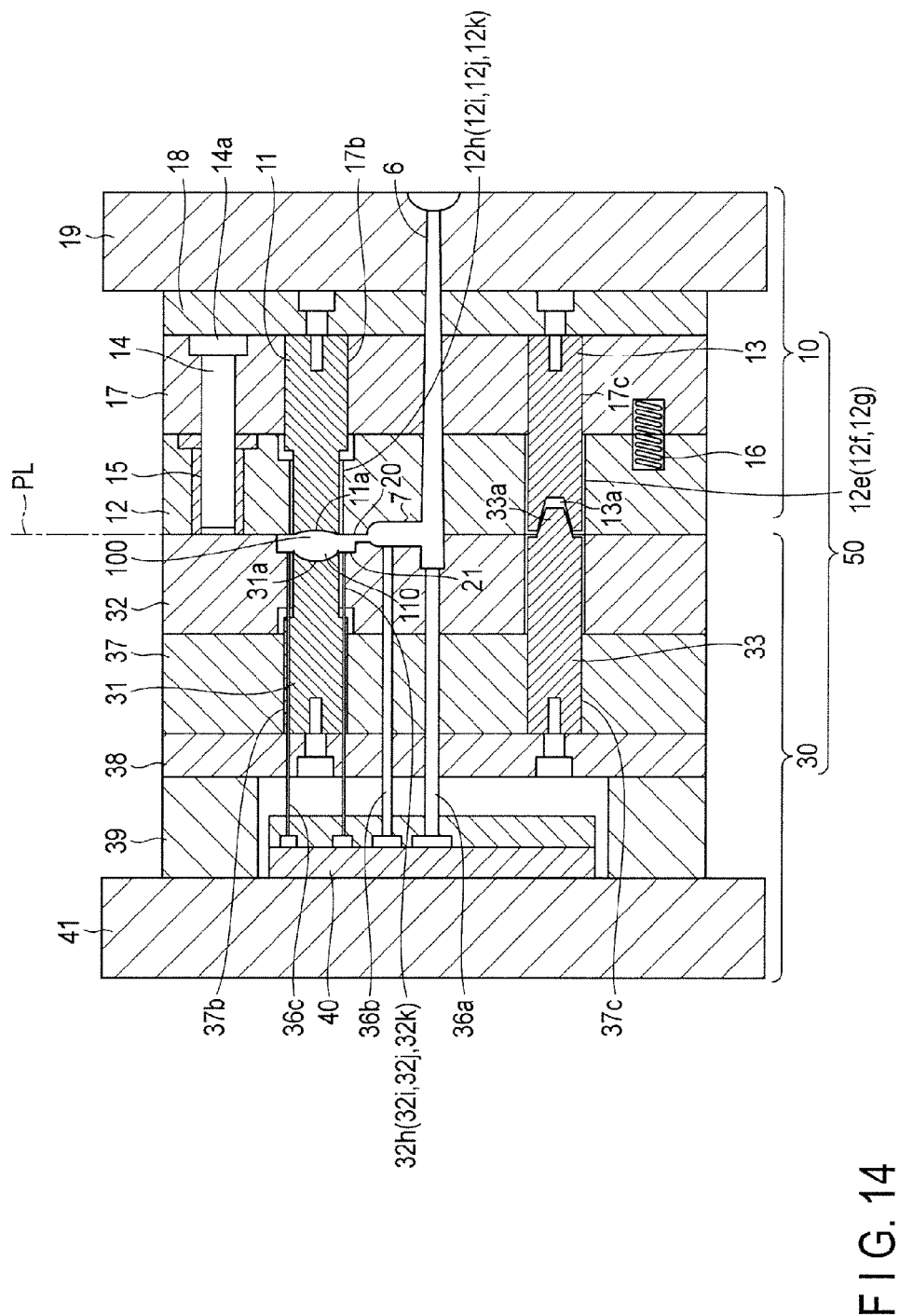
FIG. 14 is a longitudinal cross-sectional view showing a mold clamping state of a molding die structure according to a third embodiment of the present invention.

Further, a double projection unit 94 is arranged between the ejector plate 90 and the stripper projection plate 93. Furthermore, after molding the molded article 51, the movable die 80 moves to a final mold opening position shown in FIG. 11, then the ejector plate 90 and the stripper projection plate 93 are pushed up at the same time by projection of a non-illustrated molding machine, and they are moved in a direction (a mold closing direction) opposite to the mold opening direction of the movable die 80. Thereafter, in a mold release state of the movable side molding die 81 shown in FIG. 12, when the double projection unit 94 abuts on a notch of the spacer block 89, a projection amount of the ejector plate 90 becomes higher than a projection amount of the stripper projection plate 93 in the double projection unit 94 due to the principle of leverage. With the movement of this ejector plate 90, the first ejector pin 86*a* is projected to the circular concave portion 70*a*, and the four second ejector pins 86*b* are projected to the runners 71. As a result, the resin filling resin channels is ejected, and each molded article 51 in the movable die 80 is taken out. FIG. 13 shows a state that molding is completed and the molded article 51 is taken out.

(Function)

Figure 11:
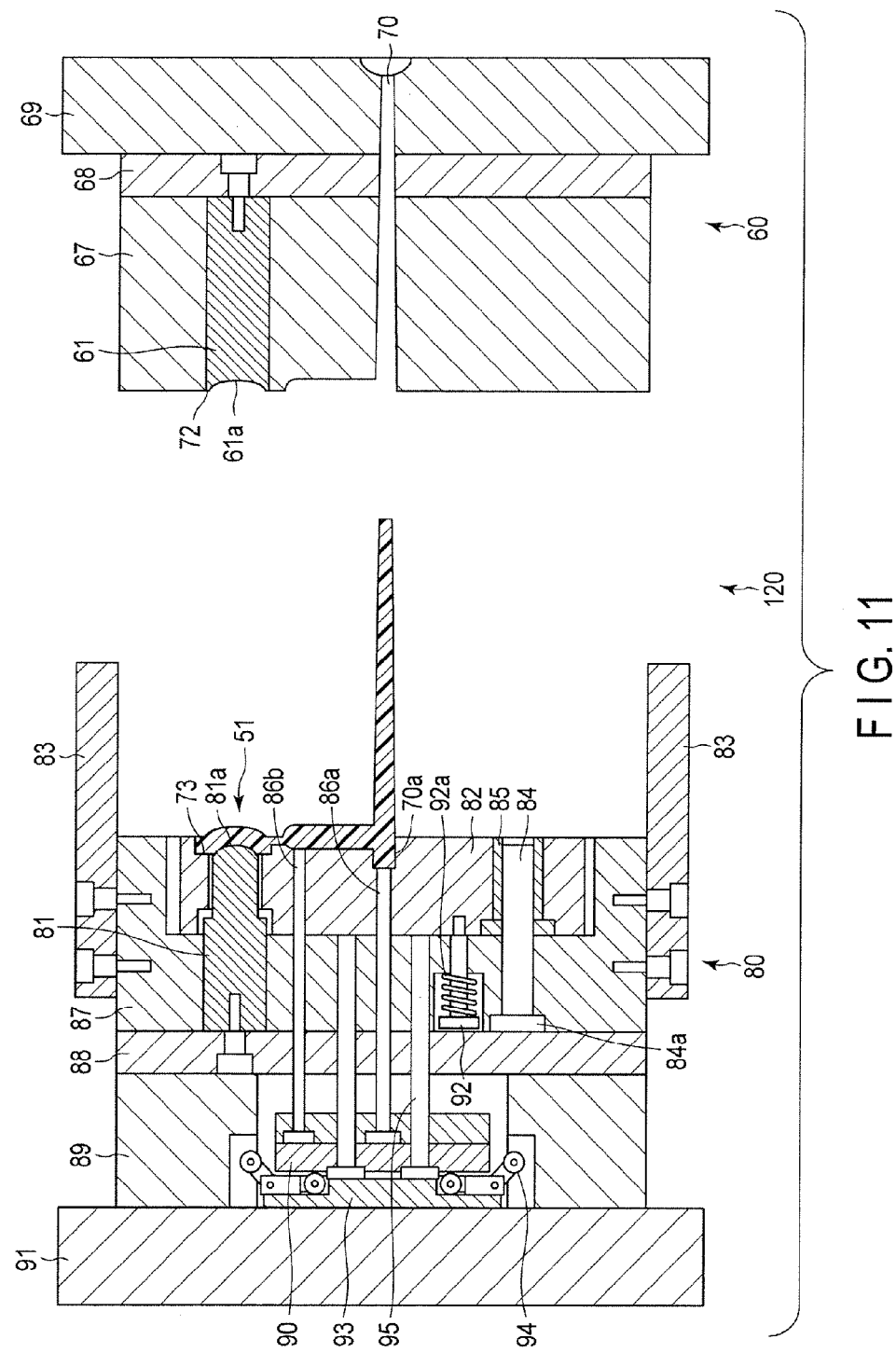
FIG. 11 is a longitudinal cross-sectional view showing a mold opening state after completion of molding according to the second embodiment.

A function of the above-described configuration will now be described. A manufacturing method of the molded article 51 molded by the molding die 120 according to this embodiment will now be described. FIG. 8 shows a mold clamping state of the molding die 120 according to this embodiment. FIG. 11 is a cross sectional view of a mold opening completed state. FIG. 12 is a cross-sectional view of a projection initial state. FIG. 13 is a cross-sectional view of a projection completed state.

At the beginning of manufacture of the molded article 51, the movable die 80 in the mold opening state shown in FIG. 11 moves closer to the fixed die 60. As a result, the entire movable die 80 integrally moves toward the fixed die 60, and the movable side plate 82 comes into contact with the fixed side plate 67. At this time, in a state that alignment is carried out by the positioning block 83 disposed to a lateral side of the movable side sleeve 87 and the outer peripheral wall portion of the fixed side sleeve 67, mold clamping is performed. As a result, the molding cavities (the fixed side cavities 200 and the movable side cavities 210) and the resin channels (the runners 71) communicating with the molding cavities are formed as shown in FIG. 8. In this mold closing state shown in FIG. 8, the coil spring 92*a* in the concave portion 87*a* is held in an initial state (an initial compression applying state).

Then, a non-illustrated resin injection unit supplies a molten material that is the molding material for each molded article 51 to the sprue 70. The molten material is, e.g., a transparent resin. The molten material is supplied into the molding cavities through the runners 71 and fills these cavities. Subsequently, a pressure holding state of the molten material filling the molding cavities is maintained with a desired pressure for a desired time. When the molten material is cooled in the molding cavities, each molded article 51 is obtained.

The molded article 51 according to this embodiment is a meniscus and has a relatively uniform thickness. Therefore, when the molten material in the molding cavities is cooled, mold release is naturally carried out by mold shrinkage. Therefore, the fixed side optical functional surface 53 and the fixed side edge portion 55 come off the first transfer portion 61*a* of the fixed side molding die 61 and the second transfer portion 72 of the fixed side sleeve 67.

Then, a mold opening operation of the movable die 80 for moving the movable die 80 in a direction away from the fixed die 60 is performed. At the time of this operation, in a state that the molded article 51 is held in the movable die 80, the molded article 51 moves with the movable die 80 along with a lump of the resin filling the channels (the sprue 70 and the runners 71). Further, in a state that the movable die 80 has moved to the mold opening completed position shown in FIG. 11, mold opening is completed.

Then, the ejector plate 90 and the stripper projection plate 93 are pushed up at the same time by the projection mechanism of the molding machine. At this time, with the movement of the stripper projection plate 93, the stripper rods 95 push up the movable side plate 82 in a direction away from the movable side sleeve 87. As a result, the molded article 51 is released from the movable die 80. At the time of this operation, as shown in FIG. 12, in the molded article 51, the movable side optical functional surface 52 comes off the second transfer portion 73 of the movable side molding die 81 in a state that the movable side edge portion 54 is supported by the second transfer portion 73 of the movable side plate 82. At this time, in regard to the coil spring 92*a* in the movable side sleeve 87, the coil spring 92*a* is compressed on the spring support bolt 92 with the movement of the movable side sleeve 87.

Thereafter, the double projection unit 94 disposed to the stripper projection plate 93 abuts on the notch of the spacer block 89, and the ejector plate 90 greatly operates beyond the double projection unit 94. Consequently, as shown in FIG. 13, the molded article 51 is taken out from the movable side plate 82 by projecting the resin filling the resin channels with the use of the ejector pin 86 as shown in FIG. 13.

Then, based on the above-described series of steps, molding of each molded article (a lens made of the resin) 51 is repeatedly carried out.

(Effect)

Thus, the above-described configuration exercises the following effect. That is, in the fixed side sleeve 67 and the movable side sleeve 87 of the molding die 120 according to this embodiment, the outer peripheral wall surface of the fixed side sleeve 67 and the outer peripheral wall surface of the movable side sleeve 87 are processed at the same time in a state that the fixed side sleeve 67 and the movable side sleeve 87 have been fabricated and assembled. Further, the hole portions (the fixed side molding die insertion hole portions 62*a*, 62*b*, 62*c*, and 62*d* and the movable side molding die insertion hole portions 87*c*) holding the respective molding dies (the fixed side molding dies 61 and the movable side molding dies 81) of the fixed side sleeve 67 and the movable side sleeve 87 are coaxially bored at the same time. As a result, the respective hole portions holding the respective components of the fixed side sleeve 67 and the movable side sleeve 87 are arranged by the positioning block 83 without a positioning displacement in such a manner that the fixed side molding dies 61 and the movable side molding dies 81 face each other with less axial displacements at the time of mold clamping. Therefore, the die components (the fixed side molding dies 61 and the movable side molding dies 81) that transfer portions requiring a high accuracy can be fixed to the accommodating portions of the fixed side sleeve 67 and the movable side sleeve 87 (the fixed side molding die insertion hole portion 62*a*, 62*b*, 62*c*, and 62*d* and the movable side molding die insertion hole portions 87*c*) with less axial displacements. Therefore, it is possible to mold each highly precise molded article 51 with less axial displacement on each surface of the molded article 51.

Furthermore, at the time of injection molding using the molding die 120 according to this embodiment, in the molded article 51, the fixed side optical functional surface 53 and the fixed side edge portion 55 naturally come off the first transfer portion 61*a* of the fixed side molding die 61 and the second transfer portion 72 of the fixed side sleeve 67 by cooling shrinkage at the time of molding. Therefore, the molded article 51 is released from the fixed die 60 by the mold opening operation that the movable die 80 is separated from the fixed die 60.

Moreover, at the time of releasing the molded article 51 from the movable die 80, in the molded article 51, the movable side optical functional surface 52 is removed from the movable side molding die 31 in a state that the movable side edge portion 54 is supported by the second transfer portion 73 of the movable side plate 82. Then, the resin filling the resin channels is projected by the ejector pins 86. Therefore, the molded article 51 is taken out from the movable side plate 82. As a result, the molded article 51 in the movable die 80 is gradually released.

Therefore, in this embodiment, likewise, a projecting region that is required in case of taking out the molded article 51 from the molding die 120 does not have to be provided to the molded article 51, and it is possible to mold the highly precise molded article 51 that is not deformed even if it is the molded article 51 having a small diameter. Moreover, since the molding die that transfers the optical surfaces of the molded article 51 does not have to slide and a sliding clearance is not required, the axial displacement of each optical surfaces can be suppressed to the minimum level, and the highly precise molded article 51 with less axial displacements can be stably produced.

[Third Embodiment]

Portions different from the first embodiment alone will be described hereinafter with reference to FIG. 14, FIG. 15, FIG. 16, FIG. 17, and FIG. 18.

(Configuration)

An ejector plate 40 further has third ejector pins 36*c* disposed to the ejector plate 40.

A description will be given as to the third ejector pins 36*c* arranged relative to a movable side molding die insertion hole portion 32*h* as an example.

More than one third ejector pin 36*c* is arranged. The number is, e.g., four. These third ejector pins 36*c* are concentrically arranged around the movable side molding die 31.

Each third ejector pin 36*c* penetrates through a movable side supporting plate 38 and a proximal end portion of each movable side molding die 31. Additionally, the third ejector pins 36*c* are arranged between a lateral side of a distal end portion of the movable side molding die 31 and the movable side molding die insertion hole portion 32*h* to be extended to a second transfer portion 21.

The third ejector pins 36*c* are provided substantially around the movable side molding die 31 at positions corresponding to a movable side edge portion 4.

Although the third ejector pins 36*c* provided in each movable side molding die insertion hole portion 32*h* have been described above, the third ejector pins 36*c* are also provided relative to each of the movable side molding die insertion hole portions 32*i*, 32*j*, and 32*k* like this description.

(Function)

Figure 16:
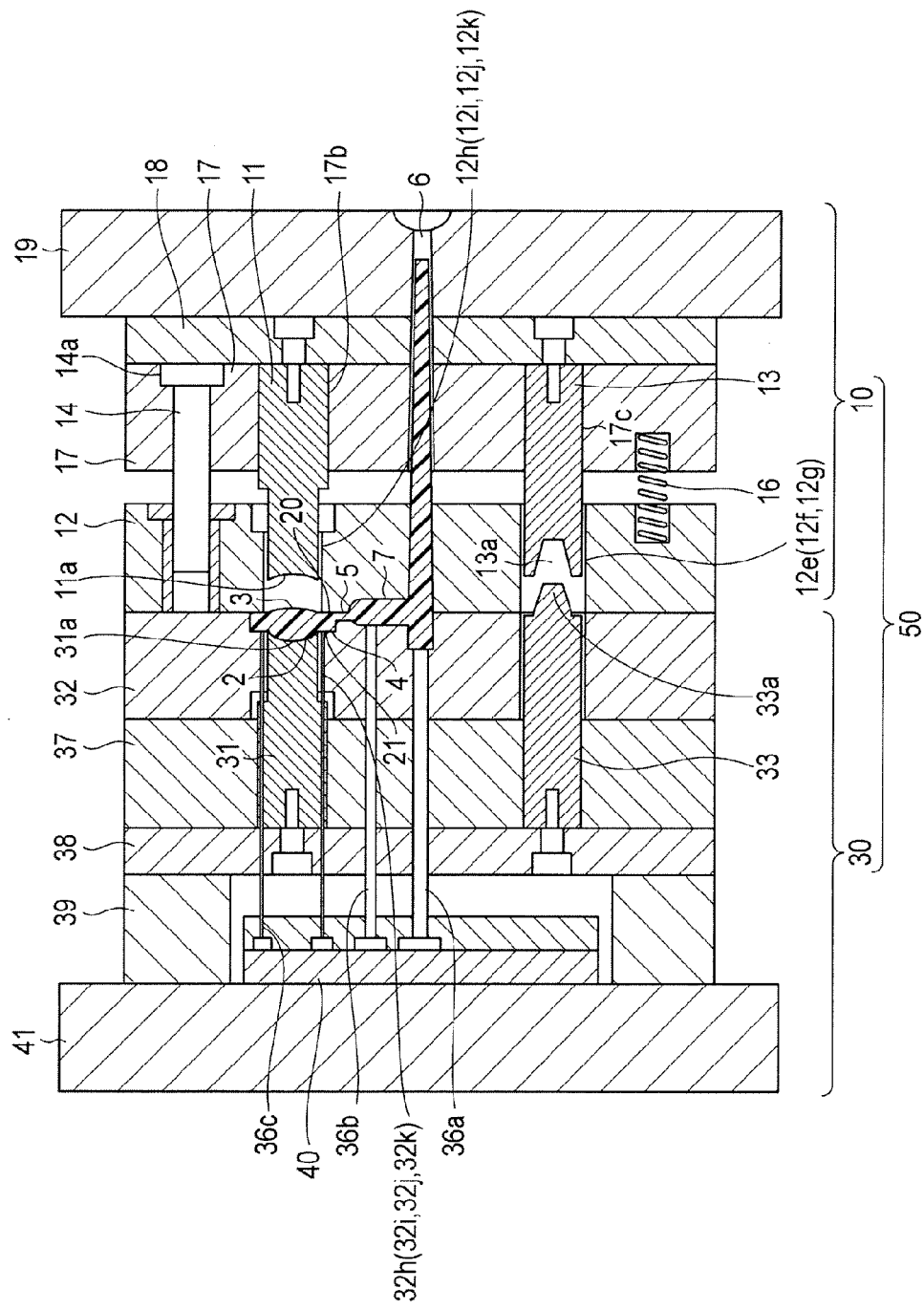
FIG. 16 is a longitudinal cross-sectional view showing a mold release state of a fixed die according to the third embodiment.
Figure 17:
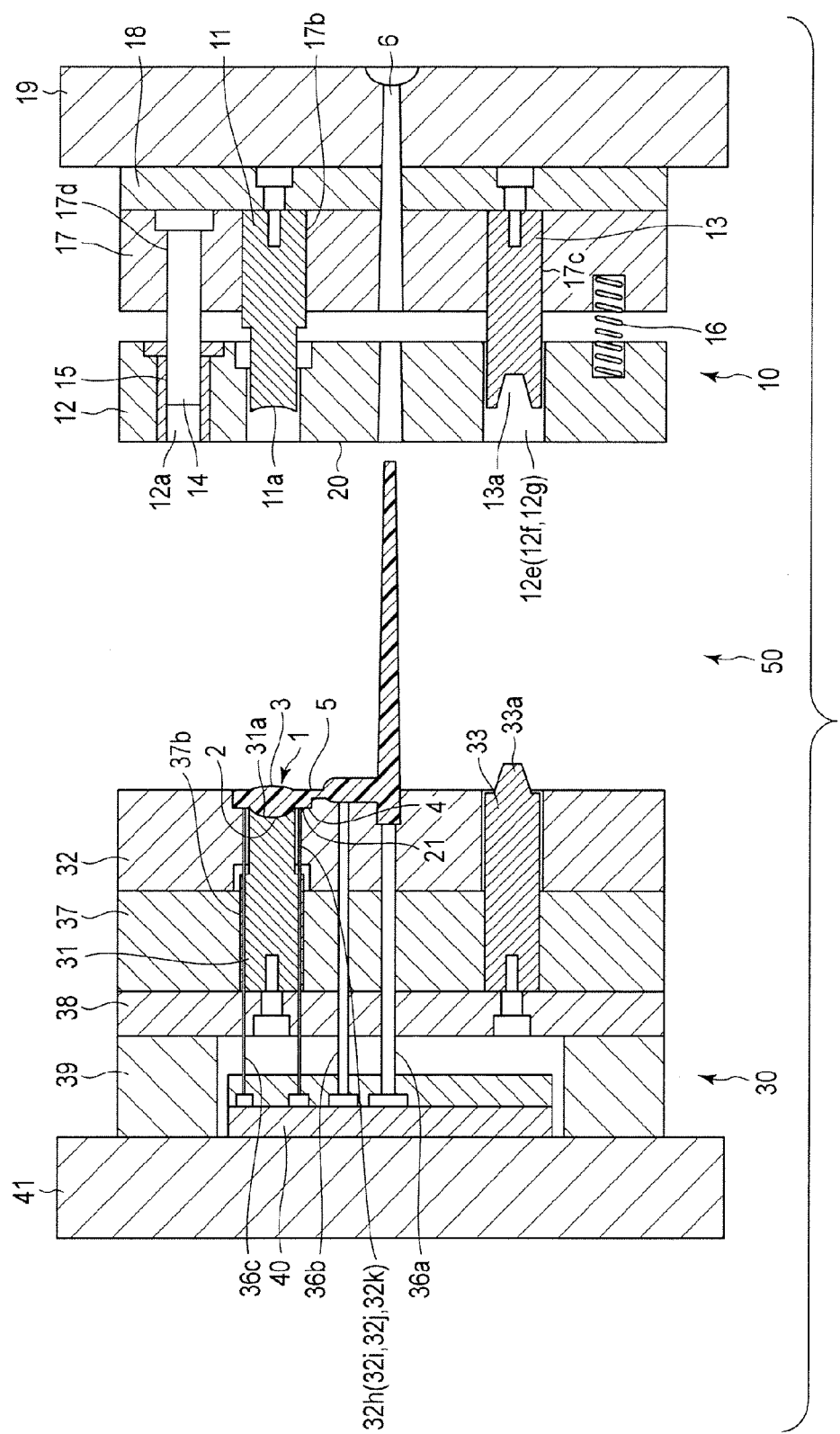
FIG. 17 is a longitudinal cross-sectional view showing a mold opening state after completion of molding of the molding die according to the first embodiment.

After a movable die 30 has moved to a third movement position (a final mold opening position) shown in FIG. 16, the ejector plate 40 is driven by a projection mechanism of a molding machine. At this time, as shown in FIG. 17, the ejector plate 40 moves in a direction (a mold closing direction) opposite to a mold opening direction of the molding die 30. With the movement of this ejector plate 40, a first ejector pin 36*a* protrudes from a circular concave portion 6*a*, and four second ejector pins 36*b* protrude from runners 7.

Further, in this embodiment, as shown in FIG. 17, the third ejector pins 36*c* simultaneously protrude from the second transfer portion 21 as shown. Furthermore, the third ejector pins 36*c* push out the movable side edge portion 4 from the second transfer portion 21.

Figure 18:
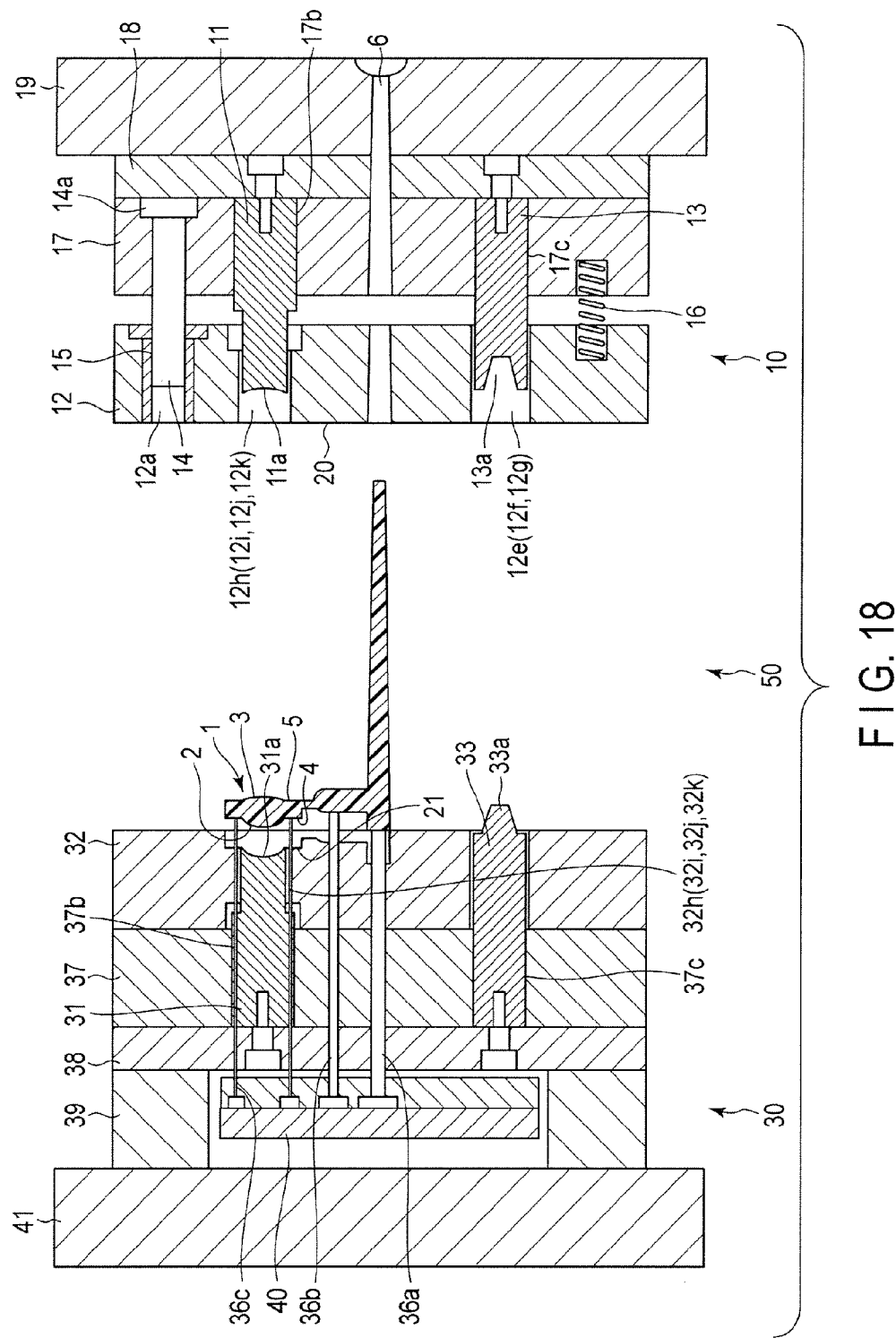
FIG. 18 is a longitudinal cross-sectional view showing a projecting state of a molded article from the molding die according to the first embodiment.

Consequently, as shown in FIG. 18, in each molded article 1 arranged in the movable die 30, the movable side edge portion 4 comes off the second transfer portion 21, and the molded article 1 is taken out. As described above, the third ejector pins 36*c* included in an ejection mechanism are arranged in the movable die 30, and they abut on the movable side edge portion 4 which is a portion other than the movable side optical functional surface 2 at the time of mold opening to push out the movable side edge portion, thereby taking out the molded article 1 from the movable die 30.

Then, based on the series of steps, molding of the molded article (a lens made of resin) 1 is repeatedly carried out.

(Effect)

In this embodiment, the molded article 1 can be directly taken out from the movable die 30 by the third ejector pins 36*c*. Therefore, in this embodiment, the molded article 1 can be taken out while highly precisely maintaining a shape of the molded article 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A molding die, comprising:
    fixed and movable dies moveable relative to one another between open and closed positions, the fixed and movable dies having fixed and movable die cavity surfaces, respectively, which cooperate to form a die cavity in which a molded article having first and second optical functional surfaces is formed when the fixed and movable dies are in the closed position and a molding material is applied to the die cavity;
    the fixed die including:
        a fixed die sleeve having an accommodating portion in which a first molding die is fixedly secured, the first molding die having a first transfer portion defining a portion of the fixed die cavity surface corresponding to the first optical functional surface of the molded article; and
        a fixed die release member having an insertion/removal hole into which the first molding die extends, the fixed die release member being moveable relative to the fixed die sleeve between a first position wherein it abuts the fixed die sleeve and a second position wherein it is removed from the fixed die sleeve whereby the first die moves into and out of the fixed die insertion/removal hole in response to movement of the fixed die release member between the first and second positions, the fixed die release member having a second transfer portion arranged around the insertion/removal hole and defining a portion of the fixed die cavity surface corresponding to other than the first optical functional surface of the molded article wherein the second transfer portion remains in contact with the molded article when the fixed die release member is moved into the second positon but the first transfer portion is moved away from the molded article when the fixed die release member is moved into the second position; and a moveable die including:

a movable die sleeve having an accommodating portion in which a second molding die is located, the second molding die having a third transfer portion defining a portion of the movable die cavity surface corresponding to the second optical functional surface of the molded article.

2. The molding die structure of a molded article according to claim 1, wherein the movable die further includes a movable die release member having an insertion/removal hole into which the second molding die extends, the movable die release member being moveable relative to the movable die sleeve between a third position wherein it abuts the movable die sleeve and a fourth position wherein it is removed from the movable die sleeve whereby the second die moves into and out of the insertion/removal hole of the movable die release member in response to movement of the movable die release member between the third and fourth positions, the movable die release member having a fourth transfer portion arranged around its insertion/removal hole and defining a portion of the movable die cavity surface corresponding to other than the second optical functional surface of the molded article.

3. The molding die structure of a molded article according to claim 1, further comprising an ejection mechanism that is arranged in the movable die and releases the molded article from the movable die when the ejection mechanism abuts a portion of the molded article other than the second optical functional surface and pushes the portion of the molded article other than the second optical functional surface away from the moveable die while the fixed die and the movable die are in the open position.

4. The molding die structure of a molded article according to claim 2, further comprising an ejection mechanism that is arranged in the movable die, communicates with the die cavity, abuts on the molding material filling a channel portion through which the molding material flows, releases the molding material, and with it the molded article, from the channel portion to separate the second transfer portion of the movable die from the portion of the molded article other than the second optical functional surface of the molded article.

* * * * *